United States Patent
Yamada

(10) Patent No.: US 9,634,912 B2
(45) Date of Patent: Apr. 25, 2017

(54) COMPUTER, RESOURCE USAGE CALCULATION METHOD, AND RESOURCE USAGE CALCULATION PROGRAM

(75) Inventor: Masanobu Yamada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 236 days.

(21) Appl. No.: 14/110,664

(22) PCT Filed: Jun. 14, 2011

(86) PCT No.: PCT/JP2011/063582
§ 371 (c)(1),
(2), (4) Date: Oct. 8, 2013

(87) PCT Pub. No.: WO2012/172641
PCT Pub. Date: Dec. 20, 2012

(65) Prior Publication Data
US 2014/0032752 A1   Jan. 30, 2014

(51) Int. Cl.
*H04L 12/26* (2006.01)
*G06F 11/34* (2006.01)
*G06F 9/50* (2006.01)

(52) U.S. Cl.
CPC .............. *H04L 43/04* (2013.01); *G06F 9/50* (2013.01); *G06F 9/5061* (2013.01);
(Continued)

(58) Field of Classification Search
CPC ........ H04L 43/04; G06F 11/3409; G06F 9/50; G06F 9/5061; G06F 2209/508; G06F 2201/865
See application file for complete search history.

(56) References Cited

U.S. PATENT DOCUMENTS

| | | | |
|---|---|---|---|
| 8,156,481 B1 * | 4/2012 | Koh | G06F 9/443 717/151 |
| 8,775,125 B1 * | 7/2014 | Aguiling | G06F 11/3433 702/186 |

(Continued)

FOREIGN PATENT DOCUMENTS

| | | |
|---|---|---|
| JP | 08-087448 A | 4/1996 |
| JP | 11-272512 A | 10/1999 |

(Continued)

OTHER PUBLICATIONS

International Search Report received in PCT/JP2011/063582 dated Aug. 23, 2011.

*Primary Examiner* — Vivek Srivastava
*Assistant Examiner* — Todd L Barker
(74) *Attorney, Agent, or Firm* — Foley & Lardner LLP

(57) ABSTRACT

Provided is a computer, comprising a memory which stores a program and a processor which executes the program which is stored in the memory for each predetermined processing unit, with which a computer resource usage is calculated by a process which is executed for each predetermined processing unit. The computer resources include overlapping resources which are used in an overlapping manner when the program is executed and non-overlapping resources which are not used in an overlapping manner when the program is executed. When calculating the computer resource usage by the process which is executed for each predetermined processing unit, the processor determines, by analyzing the computer resources, the overlapping resources which are used by the process and the non-overlapping resources which are used by the process, and calculates the computer resource usage by the process on the basis of the result of the determination.

13 Claims, 31 Drawing Sheets

(52) U.S. Cl.
 CPC .... *G06F 11/3409* (2013.01); *G06F 2201/865* (2013.01); *G06F 2209/508* (2013.01)

(56) References Cited

U.S. PATENT DOCUMENTS

| | | | | |
|---|---|---|---|---|
| 2002/0165892 A1* | 11/2002 | Grumann | ................ | G06F 11/34 718/100 |
| 2009/0271472 A1* | 10/2009 | Scheifler | ................ | G06F 9/485 709/202 |
| 2011/0225372 A1* | 9/2011 | Pirog | .................... | G06F 9/3851 711/141 |
| 2012/0180062 A1* | 7/2012 | Sohi | ...................... | G06F 9/5066 718/104 |

FOREIGN PATENT DOCUMENTS

| | | |
|---|---|---|
| JP | 2001-331348 A | 11/2001 |
| JP | 2006-285871 A | 10/2006 |
| JP | 2009-110213 A | 5/2009 |

\* cited by examiner

Fig. 3

342a  FRAME-PROPRIETARY MEMORY INFORMATION TABLE

| FRAME-PROPRIETARY MEMORY INFORMATION ID 301 | THREAD ID 302 | METHOD NAME 303 | FRAME-PROPRIETARY MEMORY USAGE 304 | REFERENT-FRAME-SHARED MEMORY INFORMATION ID 305 | REFERENT-THREAD-SHARED MEMORY INFORMATION ID 306 |
|---|---|---|---|---|---|
| #1 | #1 | Class1.methodA | 84 | #F1<br>#F2 | — |
| #2 | #1 | Class1.methodB | 36 | #F1 | #T1 |
| #3 | #2 | Class2.methodC | 24 | #F3 | — |
| #4 | #2 | Class2.methodD | 0 | — | — |
| #5 | #2 | Class2.methodE | 12 | #F3 | — |
| #6 | #3 | Class3.methodF | 68 | — | #T1 |
| #7 | #3 | Class3.methodG | 28 | — | #T2 |
| ... | ... | ... | ... | ... | ... |
| #n | #n | ClassN.methodX | 88 | — | #T2 |

Fig. 4

342b FRAME-SHARED MEMORY INFORMATION TABLE

| FRAME-SHARED MEMORY INFORMATION ID 401 | ADDRESS 402 | CLASS NAME 403 | FRAME-SHARED MEMORY USAGE 404 | REFERENT-FRAME-SHARED MEMORY INFORMATION ID 405 | REFERENT-THREAD-SHARED MEMORY INFORMATION ID 406 |
|---|---|---|---|---|---|
| #F1 | 0x15ab84c4 | Class A | 60 | — | — |
| #F2 | 0x16cba880 | Class B | 12 | — | — |
| #F3 | 0x17b8ec84 | Class C | 84 | — | #T1 |

Fig. 5

342c THREAD-SHARED MEMORY INFORMATION TABLE

| THREAD-SHARED MEMORY INFORMATION ID (501) | ADDRESS (502) | CLASS NAME (503) | THREAD-SHARED MEMORY USAGE (504) | REFERENT-FRAME-SHARED MEMORY INFORMATION ID (505) | REFERENT-THREAD-SHARED MEMORY INFORMATION ID (506) |
|---|---|---|---|---|---|
| #T1 | 0x1a827b80 | Class D | 72 | #F2 | — |
| #T2 | 0x1238cc48 | Class E | 120 | — | — |

601 OBJECT
602 OBJECT HEADER
603 OBJECT DATA

701

| OBJECT TYPE | OBJECT TYPE BIT |
|---|---|
| UNANALYZED | 00 |
| NECESSARY | 01 |
| FRAME SHARING | 10 |
| STACK SHARING | 11 |

Fig. 24

342d DEVELOPED FRAME-PROPRIETARY MEMORY INFORMATION TABLE

| FRAME-PROPRIETARY MEMORY INFORMATION ID ~301 | THREAD ID ~302 | METHOD NAME ~303 | FRAME-PROPRIETARY MEMORY USAGE ~304 | REFERENT-FRAME-SHARED MEMORY INFORMATION ID ~805 | REFERENT-THREAD-SHARED MEMORY INFORMATION ID ~806 |
|---|---|---|---|---|---|
| #1 | #1 | Class1.methodA | 84 | #F1<br>#F2 | — |
| #2 | #1 | Class1.methodB | 36 | #F1 | — |
| #3 | #2 | Class2.methodC | 24 | — | #T1⇒#F2 |
| #4 | #2 | Class2.methodD | 0 | #F3⇒#T1⇒#F2 | — |
| #5 | #2 | Class2.methodE | 12 | #F3⇒#T1⇒#F2 | — |
| #6 | #3 | Class3.methodF | 68 | — | #T1⇒#F2 |
| #7 | #3 | Class3.methodG | 28 | — | #T2 |
| ⋮ | ⋮ | ⋮ | ⋮ | ⋮ | ⋮ |
| #n | #n | ClassN.methodX | 88 | — | #T2 |

Fig. 27

| THREAD ID 2701 | PROPRIETARY MEMORY USAGE 2702 | SHARED MEMORY USAGE 2703 | TOTAL MEMORY USAGE 2704 |
|---|---|---|---|
| #1 | 180 | 84 | 264 |
| #2 | 120 | 84 | 204 |
| #3 | 96 | 204 | 300 |
| ... | ... | ... | ... |
| #n | 88 | 120 | 208 |

Fig. 28

| THREAD ID OF TERMINATING THREAD | RELEASE OF THREAD-PROPRIETARY MEMORY | RELEASE OF THREAD-SHARED MEMORY | TOTAL MEMORY RELEASE |
|---|---|---|---|
| #1 AND #2 | 300 | 0 | 300 |
| #1 AND #3 | 276 | 0 | 276 |
| #1 AND #n | 268 | 0 | 268 |
| #2 AND #3 | 216 | 0 | 216 |
| #2 AND #n | 208 | 0 | 208 |
| #3 AND #n | 184 | 120 | 304 |

*Fig. 34*

```
                                                    /3400
┌─────────────────────────────────────────────────────┐
│ Object reference <Address = 0x1a827b80>             │
│ ═══════════════════════════════════════════         │
│   <Address = 0x1a827b80><Class name = ClassD><Size = 72><TSMI_ID = #T1>│
│    +-- <Address = 0x1a827b80><Class name = ClassB><Size = 12><FSMI_ID = #F2>│
└─────────────────────────────────────────────────────┘
```

*Fig. 35*

```
                                                    /3500
┌─────────────────────────────────────────────────────┐
│ Object reference <Class name = ClassB>              │
│ ═══════════════════════════════════════════         │
│   <Address = 0x16cba880><Class name = ClassB><Size = 12><FSMI_ID = #F2>│
│   <Address = 0x18ac1930><Class name = ClassB><Size = 84>│
│    +-- <Address = 0x23a118d4><Class name = ClassH><Size = 36>│
│    +-- <Address = 0x25ccb84c><Class name = ClassJ><Size = 24>│
│    ...                                              │
│   <Address = 0x1a2bdd14><Class name = ClassB><Size = 84>│
│    +-- <Address = 0x1da200d8><Class name = ClassH><Size = 36>│
│        +-- <Address = 0x1da200d8><Class name = ClassH><Size = 36>│
│        ...                                          │
│    +-- <Address = 0x26cab844><Class name = ClassJ><Size = 108>│
│    ...                                              │
└─────────────────────────────────────────────────────┘
```

COMPUTER, RESOURCE USAGE CALCULATION METHOD, AND RESOURCE USAGE CALCULATION PROGRAM

This application is the National Phase of PCT/JP2011/063582, filed Jun. 14, 2011, the disclosures of which is hereby incorporated by reference in its entirety.

BACKGROUND OF THE INVENTION

This invention relates to a computer, a resource usage calculation method, and a resource usage calculation program.

Each process (for example, business application) of a program (for example, Java application server) that is run on a virtual machine (for example, Java VM) is executed thread by thread. When threads are executed, memory areas (stack areas) dedicated for the individual threads and a memory area (heap area) shared by all the threads are used as needed. An unnecessary memory (object) is collected automatically by a garbage collection (hereinafter referred to as "GC") function of the virtual machine.

There is known a technology of controlling a process which is executed in a thread in accordance with the memory usage in the process. The process that is executed in the thread includes a process that is executed in a thread alone, a process that is executed in the units of stack frames in a thread, and a process that is executed in a plurality of threads. However, a plurality of processes may use the same memory in an overlapping manner. Therefore, it is difficult to calculate the memory usage in each process executed in a thread.

Japanese Patent Application Laid-open No. 2009-110213 discloses a technology for solving this problem. The technology disclosed in Japanese Patent Application Laid-open No. 2009-110213 can roughly calculate a target memory usage in a specific function (process) which is executed in a thread, based on the remaining memory of the virtual machine at the start of the execution of the specific function and other functions that are executed at the same time as the specific function.

SUMMARY OF THE INVENTION

However, the method disclosed in Japanese Patent Application Laid-open No. 2009-110213 has a problem in that the usage of resources (for example, the above-mentioned amount of memory) that are actually used at an arbitrary point of time by a specific process (for example, process executed in the thread) cannot be calculated. This is because it is unknown which resource is used only by a specific process and which resource is used by a specific process and other processes in an overlapping manner.

Accordingly, in view of the above-mentioned problem, it is an object of this invention to provide a computer, a resource usage calculation method, and a resource usage calculation program which are capable of efficiently and accurately calculating the usage of resources that are actually used at an arbitrary point of time by a specific process.

According to an exemplary embodiment of this invention, there is provided a computer for calculating usage of a computer resource used by a process that is executed in a predetermined processing unit, the computer comprising: a memory for storing a program; and a processor for executing the program stored in the memory in each predetermined processing unit, wherein the computer resource comprises overlapping resources that are used in an overlapping manner when the program is executed, and non-overlapping resources that are not used in an overlapping manner when the program is executed, and wherein the processor is configured to: analyze, when calculating the usage of the computer resource used by the process that is executed in the predetermined processing unit, the computer resource to determine which resource in the overlapping resources is used by the process and which resource in the non-overlapping resources is used by the process; and calculate the usage of the computer resource used by the process based on a result of the determination.

According to this invention, the usage of resources that are actually used by a specific process can be efficiently and accurately calculated.

BRIEF DESCRIPTION OF THE DRAWINGS

FIG. 3 is a diagram illustrating an example of a frame-proprietary memory information table according to the embodiment of this invention.

FIG. 4 is a diagram illustrating an example of a frame-shared memory information table according to the embodiment of this invention.

FIG. 5 is a diagram illustrating an example of a thread-shared memory information table according to the embodiment of this invention.

FIG. 24 is a diagram illustrating an example of the frame-proprietary memory information table after development of the embodiment of this invention.

FIG. 27 is a diagram illustrating an example of a purpose-based memory usage of each thread according to the embodiment of this invention.

FIG. 28 is a diagram illustrating an example of a memory release released when execution of plurality of threads is terminated according to the embodiment of this invention.

FIG. 34 is a diagram illustrating a fourth detailed output example of the result of calculating the memory usage according to the embodiment of this invention.

FIG. 35 is a diagram illustrating a fifth detailed output example of the result of calculating the memory usage according to the embodiment of this invention.

DETAILED DESCRIPTION OF THE PREFERRED EMBODIMENTS

An embodiment of this invention is described below with reference to the accompanying drawings. The following description of this embodiment is given of a case where this invention is adapted to a computer system 1 on which a Java VM 32 runs.

Figure 1:
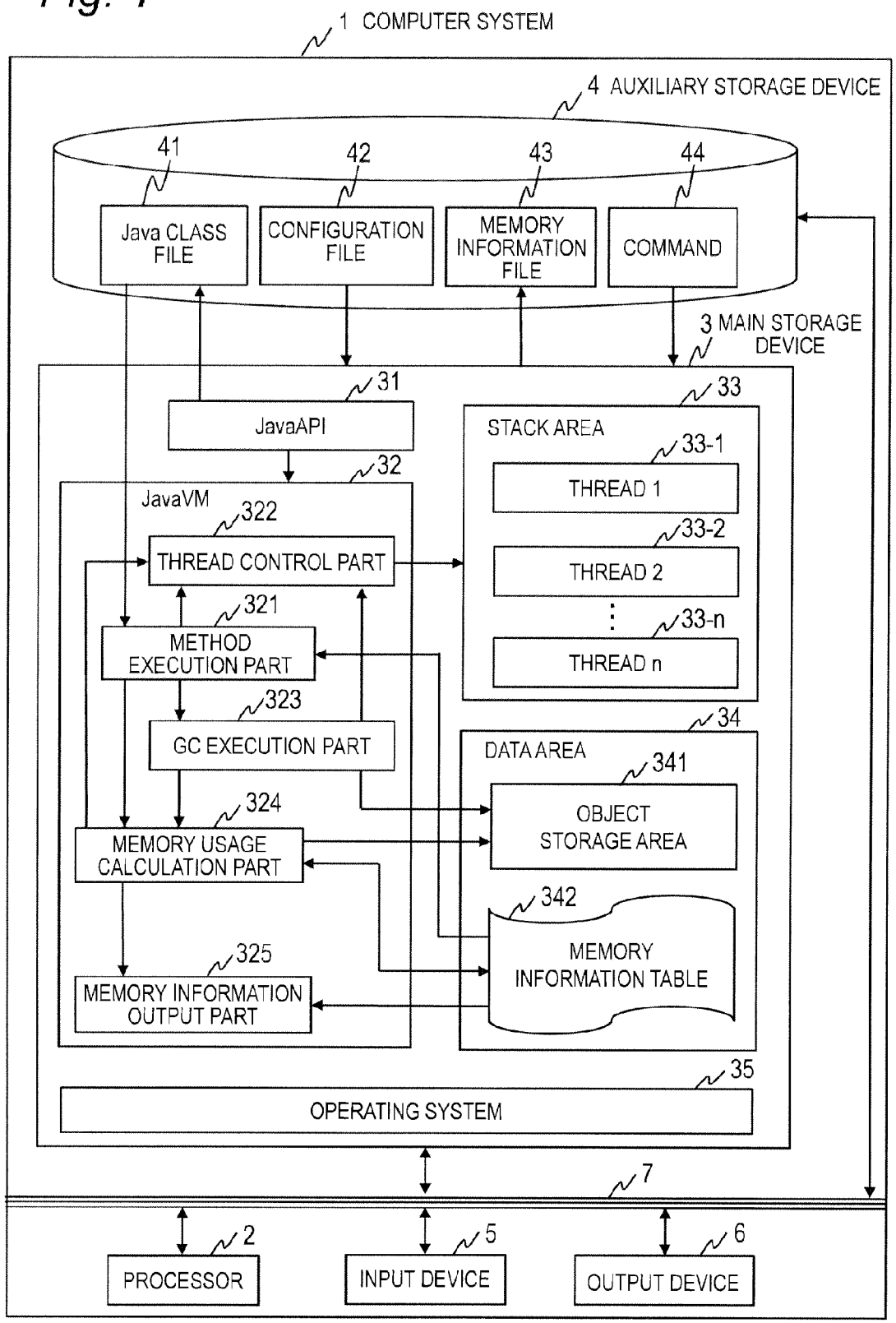
FIG. 1 is a diagram illustrating a configuration example of a computer system 1 on which a Java VM runs according to an embodiment of this invention.

FIG. 1 is a diagram illustrating a configuration example of the computer system 1 on which the Java VM 32 runs according to the embodiment of this invention. FIG. 1 illustrates the input and output of data in the computer system 1 by arrows.

In the computer system 1 (information processing apparatus or computer), the Java VM 32 executes a Java class file 41 to carry out a predetermined application process. In other words, the Java class file 41 is a program for executing the predetermined application process. The Java class file 41 is written in byte codes which can be interpreted and executed by the Java VM 32 by using an interpreter. In addition, the Java class file 41 is written in the Java language. The Java class file 41 is generated when a Java source file (not shown) that can write the calling of a Java API 31 is compiled by a Java compiler (not shown).

The computer system 1 includes a processor (control part) 2, a main storage device (storage part) 3, an auxiliary storage device (storage part) 4, an input device 5, and an output device 6. The processor 2, the main storage device 3, the auxiliary storage device 4, the input device 5, and the output device 6 are connected to one another by a bus 7.

The processor 2 runs various programs stored in the main storage device 3 to execute various processes.

The main storage device 3 stores a program, information needed for execution of the program, and the result of executing the program. The main storage device 3 may be a volatile memory or a non-volatile memory. The main storage device 3 stores the Java API 31, the Java VM 32, a stack area 33, a data area 34, and an operating system 35.

The auxiliary storage device 4 stores the Java class file 41, a configuration file 42, a memory information file 43, and a command 44. The Java class file 41 is a program for executing an application process. The configuration file 42 records the configurations that control the operation of the Java VM 32. The memory information file 43 stores the result of calculation of the memory usage. The command 44 controls the operation of the Java VM 32.

The input device 5 is an interface for inputting necessary information to the computer system 1. For example, the input device 5 is a keyboard, a mouse, or the like.

The output device 6 outputs information such as a processing result to the outside. For example, the output device 6 is a display.

The stack area 33 is an area where information needed to execute a thread and the result of processing a thread are stored. When a thread is generated, a unique stack area (for example, stack area 33-1) is assigned to the thread.

The data area 34 is an area where information needed to execute a program and the result of processing the program are stored. The data area 34 includes an object storage area 341 and a memory information table 342. The object storage area 341 stores an object generated by the Java VM 32. The memory information table 342 stores information on the memory usage of an object that is stored in the object storage area 341 and information on a reference relationship to the memory. The details of the memory information table 342 are given later with reference to FIGS. 2 to 5.

Individual programs that are stored in the main storage device 3 are described next.

The Java Application Programming Interface (API) 31 is an interface for the basic functions (for example, a set of libraries) that the Java provides. The Java API 31 prepares a method for calling, for example, a memory usage calculation part 324. A method execution part 321 can call the memory usage calculation part 324 by executing the method.

The Java VM 32 includes the method execution part 321, a thread control part 322, a GC execution part 323, the memory usage calculation part 324, and a memory information output part 325. The method execution part 321, the thread control part 322, the GC execution part 323, the memory usage calculation part 324, and the memory information output part 325 are programs that are executed by the processor 2. The Java VM 32 is a language process executing system having a memory management mechanism that dynamically releases unnecessary memory areas.

The method execution part 321 executes a method thread by thread in accordance with each byte-code command written on the Java class file 41. When a command is an object generating command, the method execution part 321 generates an object in the object storage area 341. When there is no free area in the object storage area 341, and generation of an object fails, the method execution part 321 requests the GC execution part 323 to execute a GC process (GC-process request). When receiving the GC-process request, the GC execution part 323 executes the GC process to release an unnecessary memory area in the object storage area 341. Then, the method execution part 321 executes generation of an object again, and generates an out-of-memory error when the generation of an object also fails.

The thread control part 322 controls the thread that is executed by the method execution part 321. Specifically, the thread control part 322 assigns, for example, the stack area 33 to the thread that is generated by the method execution part 321.

When receiving the GC-process request from the method execution part 321, the GC execution part 323 performs a GC process on the object storage area 341.

The memory usage calculation part 324 calculates the memory usage in the object storage area 341 using the memory information table 342. The memory usage calculation part 324 may be called by the method execution part 321, or by the GC execution part 323.

The memory information output part 325 outputs the result of calculation by the memory usage calculation part 324 to the output device 6 such as a display. The memory information output part 325 may output the calculation result as log data.

The Java VM 32 includes a flag for controlling the operation of the Java VM 32 (hereinafter referred to as "setting flag") and a parameter threshold (hereinafter referred to as "set threshold"). Default values for the setting flag and the set threshold may be changed by specifying the values through the configuration file 42, the input device 5, and the command 44.

A program having functions of the memory usage calculation part 324 or the memory information output part 325 that are executed by the Java VM 32 may be recorded on a recording medium such as a universal serial bus (USB) memory or an SD memory card.

Figure 2:
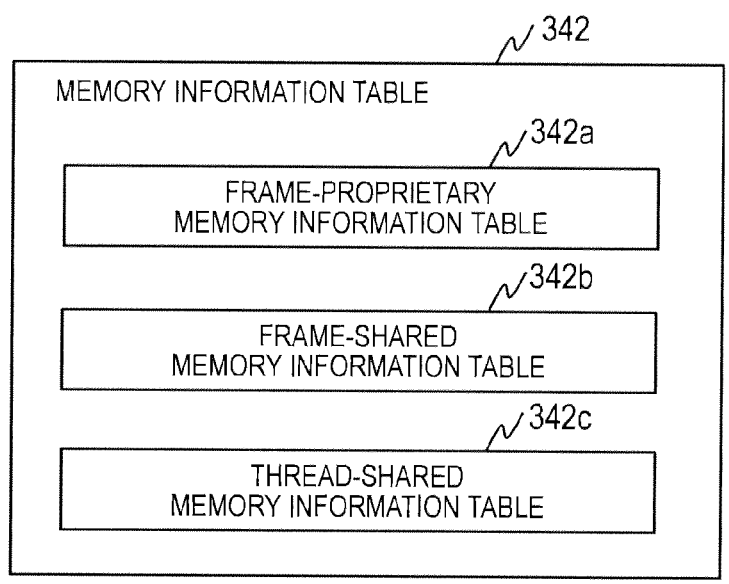
FIG. 2 is a diagram illustrating an example of a memory information table according to the embodiment of this invention.

FIG. 2 is a diagram illustrating an example of the memory information table 342 according to the embodiment of this invention.

The memory information table 342 includes a frame-proprietary memory information table 342a, a frame-shared memory information table 342b, and a thread-shared memory information table 342c. The details of the frame-proprietary memory information table 342a, the frame-shared memory information table 342b, and the thread-shared memory information table 342c are given with reference to FIGS. 3 to 5.

FIG. 3 is a diagram illustrating an example of the frame-proprietary memory information table 342a according to the embodiment of this invention.

Each entry in the frame-proprietary memory information table 342a (hereinafter referred to as "frame-proprietary memory information") includes a frame-proprietary memory information ID 301, a thread ID 302, a method name 303, a frame-proprietary memory usage 304, a referent-frame-shared memory information ID 305, and a referent-thread-shared memory information ID 306.

The frame-proprietary memory information is information on a memory that is exclusively used by a stack frame relating to a method identified by the method name 303 in a thread identified by the thread ID 302, in other words, information on a frame-proprietary memory that is exclusively used by each process executed in the thread.

The frame-proprietary memory information ID 301 is assigned to each frame-proprietary memory information, and takes a unique value (identifier) to identify each frame-proprietary memory information.

The thread ID 302 is an identifier to identify a thread.

The method name 303 is information to identify a stack frame. The method name 303 is not restrictive, and may be any information which identifies a stack frame. The identity may be enhanced by adding a package name or class name to the method name 303. The information to identify a stack frame may be the ID of the stack frame. According to the embodiment of this invention, the method name 303 is used as information to identify a stack frame, for the sake of convenience.

The frame-proprietary memory usage 304 indicates the usage of the memory that is exclusively used by a stack frame identified by the thread ID 302 and the method name 303, in other words, the usage of a frame-proprietary memory.

The referent-frame-shared memory information ID 305 is a frame-shared memory information ID 401 of the frame-shared memory information (see FIG. 4) that is referred to by the frame-proprietary memory information.

The referent-thread-shared memory information ID 306 is a thread-shared memory information ID 501 of the thread-shared memory information (see FIG. 5) that is referred to by the frame-proprietary memory information.

FIG. 4 is a diagram illustrating an example of the frame-shared memory information table 342b according to the embodiment of this invention.

Each entry in the frame-shared memory information table 342b (hereinafter referred to as "frame-shared memory information") includes a frame-proprietary memory information ID 401, an address 402, a class name 403, a frame-shared memory usage 404, a referent-frame-shared memory information ID 405, and a referent-thread-shared memory information ID 406.

The frame-shared memory information is information on a memory that is shared by different stack frames in the same thread, in other words, information on a frame-shared memory that is shared by a plurality of different processes executed in the same thread.

The frame-shared memory information ID 401 is assigned to each frame-shared memory information, and takes a unique value (identifier) to identify each frame-shared memory information.

The address 402 is the address of an object which is the root of the reference relationship in the object that is included in the frame-shared memory.

The class name 403 is the class name of an object which is the root of the reference relationship in the object that is included in the frame-shared memory. The identity may be enhanced by adding a package name to the class name 403. Because the class name 403 is obtainable from the object that is specified by the address 402, the class name 403 may be omitted. For the sake of convenience, the class name 403 is not omitted in the description of the embodiment of this invention.

The frame-shared memory usage 404 indicates the usage of the memory that is shared by different stack frames in the same thread, in other words, the usage of a frame-shared memory.

The referent-frame-shared memory information ID 405 is a frame-shared memory information ID 401 of the frame-shared memory information that is referred to by the frame-shared memory information.

The referent-thread-shared memory information ID 406 is a thread-shared memory information ID 501 of the thread-shared memory information (see FIG. 5) that is referred to by the frame-shared memory information.

FIG. 5 is a diagram illustrating an example of the thread-shared memory information table 342c according to the embodiment of this invention.

Each entry in the thread-shared memory information table 342c (hereinafter referred to as "thread-shared memory information") includes a thread-shared memory information ID 501, an address 502, a class name 503, a thread-shared memory usage 504, a referent-frame-shared memory information ID 505, and a referent-thread-shared memory information ID 506.

The thread-shared memory information is information on a memory that is shared by a plurality of different threads, in other words, information on a thread-shared memory.

The thread-shared memory information ID 501 is assigned to each thread-shared memory information, and takes a unique value (identifier) to identify each thread-shared memory information.

The address 502 is the address of an object which is the root of the reference relationship in the object that is included in the thread-shared memory.

The class name 503 is the class name of an object which is the root of the reference relationship in the object that is included in the thread-shared memory. The identity may be enhanced by adding a package name to the class name 503. Because the class name 503 is obtainable from the object that is specified by the address 502, the class name 503 may be omitted. For the sake of convenience, the class name 503 is not omitted in the description of the embodiment of this invention.

The thread-shared memory usage 504 indicates the usage of the memory that is shared by a plurality of different threads, in other words, the usage of a thread-shared memory.

The referent-frame-shared memory information ID 505 is a frame-shared memory information ID 401 of the frame-shared memory information (see FIG. 4) that is referred to by the thread-shared memory information.

The referent-thread-shared memory information ID 506 is a thread-shared memory information ID 501 of the thread-shared memory information that is referred to by the thread-shared memory information.

Figures 6, 7:
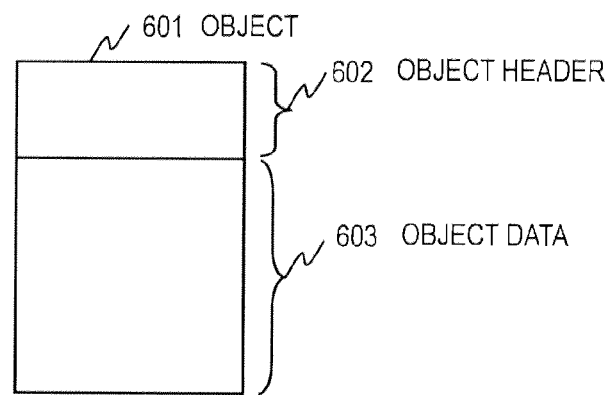
FIG. 6 is a diagram illustrating an example of the data structure of an object 601 according to the embodiment of this invention.
FIG. 7 is a diagram illustrating an example of the correspondence between object types and object type bits according to the embodiment of this invention.

FIG. 6 is a diagram illustrating an example of the data structure of an object 601 according to the embodiment of this invention.

One example of the data structure of the object 601 to be stored in the object storage area 341 (see FIG. 1) is described hereinbelow. The object 601 includes an object header 602 and object data 603.

The object header 602 is management information for the object 601. According to the embodiment of this invention, information (for example, an object type bit in FIG. 7) indicating the type of the object 601 (any one of "Unanalyzed", "Necessary", "Frame Sharing", and "Stack Sharing") is stored in the object header 602. The information indicating the type of the object 601 may be stored in the object data 603, or may be stored in an area other than the object header 602 and the object data 603. The object data 603 is the body of data of the object 601.

FIG. 7 is a diagram illustrating an example of the correspondence between the object types and object type bits according to the embodiment of this invention.

As shown in an object type table 701 of FIG. 7, object type bits (2-bit values in this example) are associated with the respective object types. According to the embodiment of this invention, a 2-bit value stored in the object header 602 (see FIG. 6) is used as the object type bits.

Figure 9:
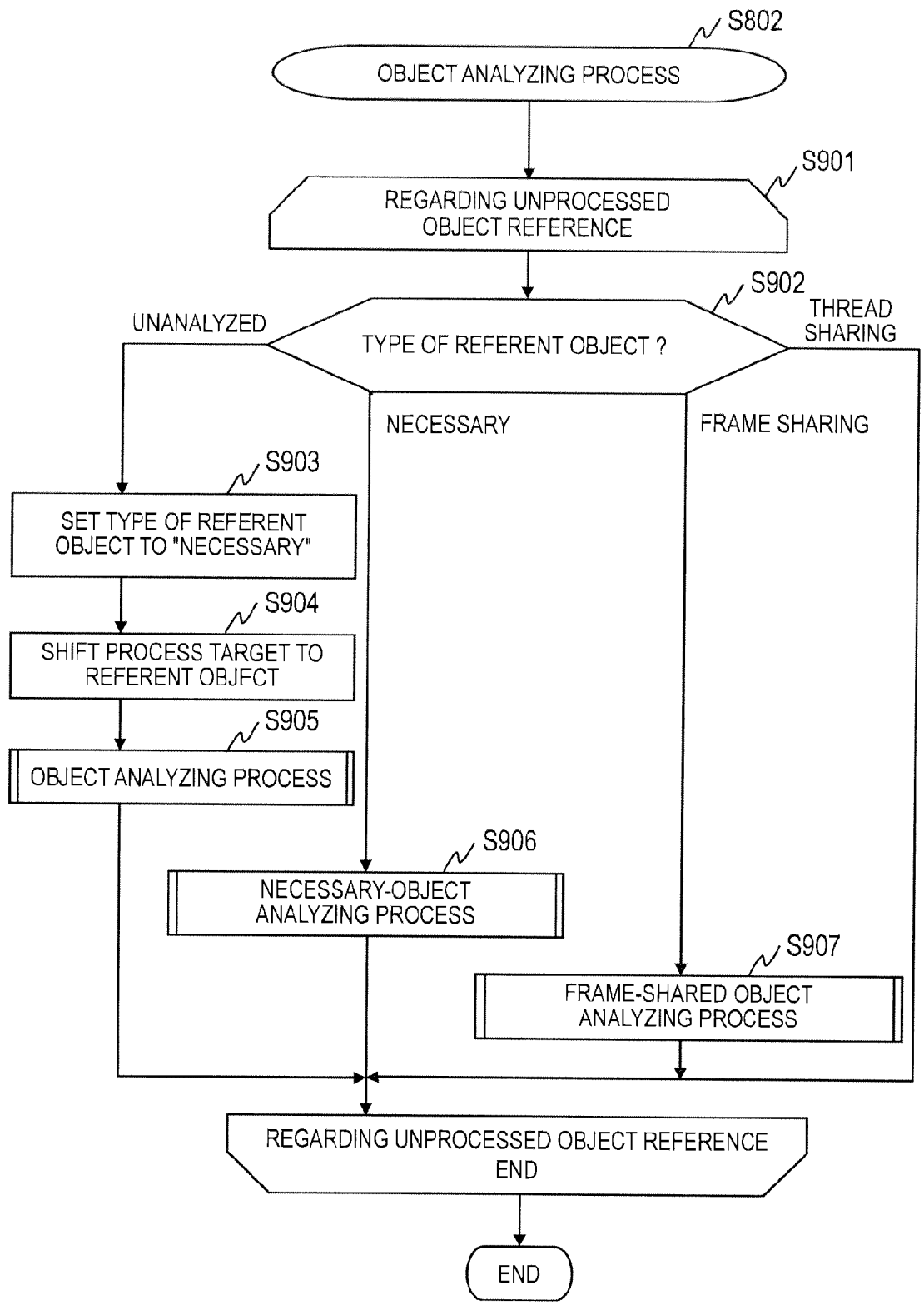
FIG. 9 is a flowchart illustrating the steps of an object analyzing process according to the embodiment of this invention.

Specifically, an object type bit of "00" indicates that the object type is "Unanalyzed", in other words, the object has not been analyzed in an object analyzing process (see FIG. 9).

Further, an object type bit of "01" indicates that the object type is "Necessary", in other words, it has already been determined in the object analyzing process that the object is needed to execute the program.

Likewise, an object type bit of "10" indicates that the object type is "Frame Sharing", in other words, it has already been determined in the object analyzing process that the object is referred to by a plurality of different stack frames in the same thread.

Further, an object type bit of "11" indicates that the object type is "Thread Sharing", in other words, it has already been determined in the object analyzing process that the object is referred to by a plurality of different threads.

[Process of Calculating Memory Usage]

Figure 8:
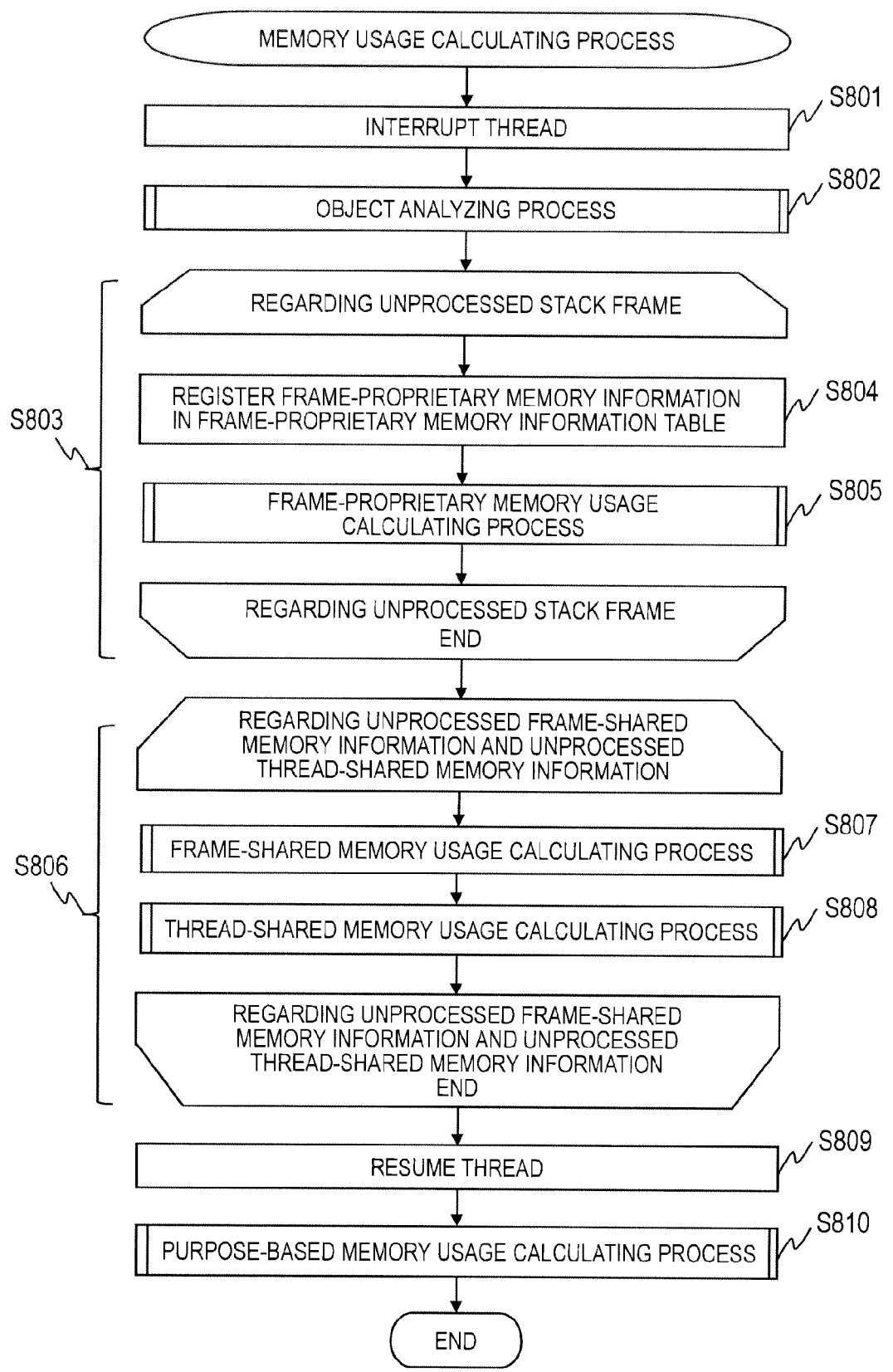
FIG. 8 is a flowchart illustrating the steps of a memory usage calculating process according to the embodiment of this invention.

FIG. 8 is a flowchart illustrating the steps of a memory usage calculating process according to the embodiment of this invention. The memory usage calculation part 324 executes this process to calculate the memory usage in the process that is executed in a thread. The process that is executed in a thread includes a process that is executed in a single thread, a process that is executed on a stack frame basis in a thread, and a process that is executed in a plurality of threads.

First, in Step 801, the memory usage calculation part 324 requests the thread control part 322 to interrupt all the threads except for the thread that executes the memory usage calculating process (S801). The thread control part 322 interrupts the threads in response to the request.

Next, in Step 802, the memory usage calculation part 324 executes the object analyzing process (S802) to thereby specify the type of each object in the object storage area 341. The details of the object analyzing process are given later with reference to FIG. 9.

Next, in Step 803, the memory usage calculation part 324 executes the processes of Step 804 and Step 805 for each stack frame unprocessed. In other words, the memory usage calculation part 324 executes the processes of Step 804 and Step 805 for every stack frame.

In Step 804, the memory usage calculation part 324 registers frame-proprietary memory information corresponding to an unprocessed stack frame in the frame-proprietary memory information table 342a (S804). Specifically, the memory usage calculation part 324 registers the frame-proprietary memory information ID 301, the thread ID 302, the method name 303, and the frame-proprietary memory usage 304 (having an initial value of 0).

In Step 805, the memory usage calculation part 324 calculates the frame-proprietary memory usage 304 of the unprocessed stack frame (S805). Specifically, the memory usage calculation part 324 calculates the frame-proprietary memory usage 304 of the unprocessed stack frame while recursively tracing object reference in the unprocessed stack frame. The details of the calculation of the frame-proprietary memory usage 304 are given later with reference to FIG. 16.

Through the above-mentioned processes of Steps 803 to 805, the memory usage calculation part 324 registers frame-proprietary memory information corresponding to all stack frames in the frame-proprietary memory information table 342a (see FIG. 3).

In next Step 806, the memory usage calculation part 324 executes the processes of Step 807 and Step 808 for unprocessed frame-shared memory information and unprocessed thread-shared memory information. In other words, the memory usage calculation part 324 executes the processes of Step 807 and Step 808 for every frame-shared memory information and every thread-shared memory information.

In Step 807, the memory usage calculation part 324 executes a frame-shared memory usage calculating process for unprocessed frame-shared memory information (S807). Specifically, the memory usage calculation part 324 adds a memory usage of a referent object indicated by the address 402 of the unprocessed frame-shared memory information to the frame-shared memory usage 404 of the unprocessed frame-shared memory information. Then, the memory usage calculation part 324 shifts (changes) the process target to the referent object, and calculates the frame-shared memory usage 404 of the unprocessed frame-shared memory information while recursively tracing object reference through steps illustrated in FIG. 19. The details of the process of calculating the frame-shared memory usage are given later with reference to FIG. 19.

In Step 808, the memory usage calculation part 324 executes a thread-shared memory usage calculating process for unprocessed thread-shared memory information (S808). Specifically, the memory usage calculation part 324 adds a memory usage of a referent object indicated by the address 502 of the unprocessed thread-shared memory information to the thread-shared memory usage 504 of the unprocessed thread-shared memory information. Then, the memory usage calculation part 324 shifts the process target to the referent object, and calculates the thread-shared memory usage 504 of the unprocessed thread-shared memory information while recursively tracing object reference through steps illustrated in FIG. 20. The details of the process of calculating the thread-shared memory usage are given later with reference to FIG. 20.

Through the above-mentioned processes of Steps 806 to 808, the memory usage calculation part 324 registers every frame-shared memory information in the frame-shared memory information table 342b (see FIG. 4). The memory usage calculation part 324 also registers every thread-shared memory information in the thread-shared memory information table 342c (see FIG. 5).

In next Step 809, the memory usage calculation part 324 makes a thread resuming request to the thread control part 322 to resume all the threads that have been interrupted in Step 801 (S809).

In next Step 810, the memory usage calculation part 324 executes a process of calculating the purpose-based memory usage to calculate the memory usage corresponding to the purpose (S810). The details of the process of calculating the purpose-based memory usage are given later with reference to FIGS. 21 to 28.

Through the processes described above, the memory usage calculation part 324 can calculate the memory usage of the process that is executed in a thread. The process of Step 810 may be executed before the process of Step S809. In the process of Step 810, not only the memory usage but also the amount of memory released when at least one thread is terminated may be calculated.

[Object Analyzing Process]

FIG. 9 is a flowchart illustrating the steps of an object analyzing process according to the embodiment of this invention. The memory usage calculation part 324 executes this process to specify the type of each object in the object storage area 341.

It should be noted that before executing the object analyzing process, the memory usage calculation part 324 sets the object type "Unanalyzed" in the object header 602 of every object stored in the object storage area 341 (initialization).

First, in Step 901, with regard to an unprocessed object reference, the memory usage calculation part 324 executes the processes of Steps 902 to 907. In other words, with regard to object reference in all the stack frames in all the threads, the memory usage calculation part 324 executes the processes of Steps 902 to 907.

In Step 902, the memory usage calculation part 324 determines the object type of a referent object (S902).

When the object type of the referent object is "Unanalyzed", the memory usage calculation part 324 sets the object type of the referent object to "Necessary" (S903). Then, the memory usage calculation part 324 shifts the process target to the referent object (S904), and recursively executes the object analyzing process (FIG. 9) on the referent object (S905).

When the object type of the referent object is "Necessary", the memory usage calculation part 324 executes a necessary-object analyzing process (S906) to analyze whether or not the object type needs to be changed to "Frame Sharing" or "Stack Sharing". Thereafter, the memory usage calculation part 324 returns to Step 901 to shift the process target to an unprocessed object reference different from the current object reference. The details of the necessary-object analyzing process are given later with reference to FIG. 10.

When the object type of the referent object is "Frame Sharing", the memory usage calculation part 324 executes a frame-shared object analyzing process (S907) to analyze whether or not the object type needs to be changed to "Thread Sharing". Thereafter, the memory usage calculation part 324 returns to Step 901 to shift the process target to an unprocessed object reference different from the current object reference. The details of the frame-shared object analyzing process are given later with reference to FIG. 11.

When the object type of the referent object is "Thread Sharing", the object type is not changed. Therefore, the memory usage calculation part 324 returns to Step S901 without executing the process, and shifts the process target to an unprocessed object reference different from the current object reference.

Through the processes described above, with regard to reference to all objects in all stack frames in all threads, the memory usage calculation part 324 specifies (sets) the object type in the referent object while recursively tracing the object reference.

Figure 10:
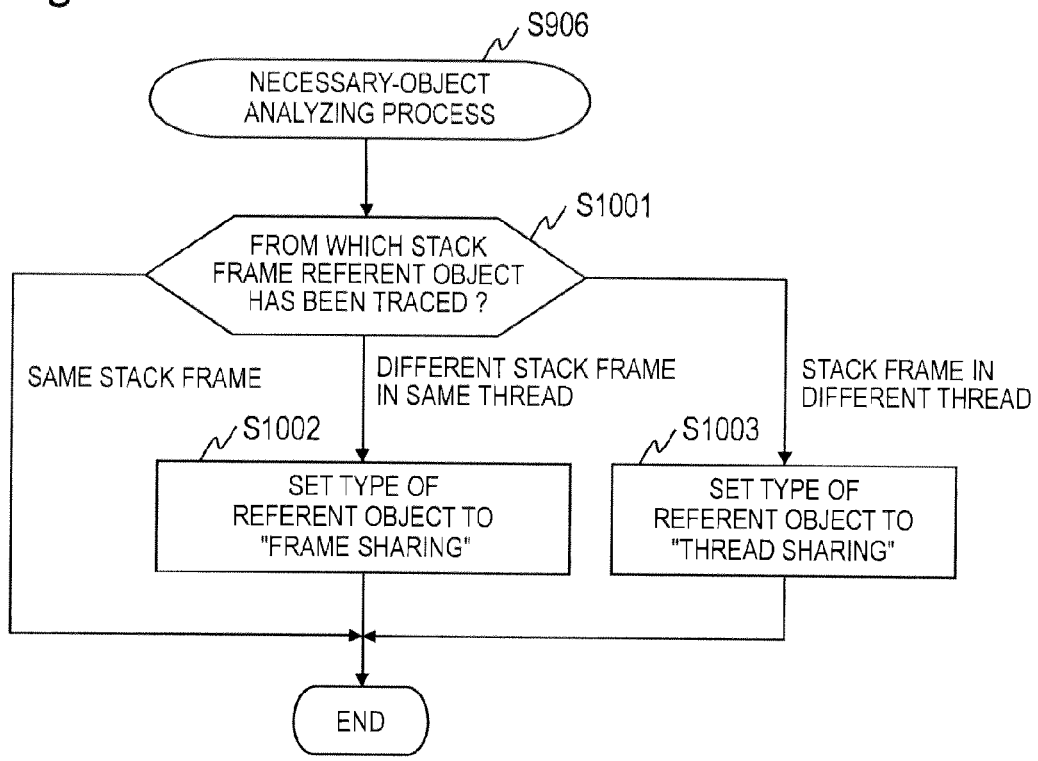
FIG. 10 is a flowchart illustrating the steps of a necessary-object analyzing process according to the embodiment of this invention.

FIG. 10 is a flowchart illustrating the steps of the necessary-object analyzing process according to the embodiment of this invention. In Step 906 of FIG. 9, the memory usage calculation part 324 executes this process.

First, in Step 1001, the memory usage calculation part 324 determines from which stack frame the referent object to be processed has been traced (S1001). In other words, the memory usage calculation part 324 compares the stack frame of the tracing source (reference source) at the time of executing the current object analyzing process with the stack frame of the tracing source at the time of executing the object analyzing process in the past.

When the referent object is an object that has already been traced from the same stack frame, the memory usage calculation part 324 does not change the object type of the referent object.

When the referent object is an object that has already been traced from a different stack frame in the same thread, the memory usage calculation part 324 sets (changes) the object type of the referent object to "Frame Sharing" (S1002).

When the referent object is an object that has already been traced from a stack frame in a different thread, the memory usage calculation part 324 sets the object type of the referent object to "Thread Sharing" (S1003).

Through the processes described above, when the object type of the referent object is "Necessary", the memory usage calculation part 324 sets (changes) the object type of the referent object, depending on from which stack frame the referent object has been traced.

Figure 11:
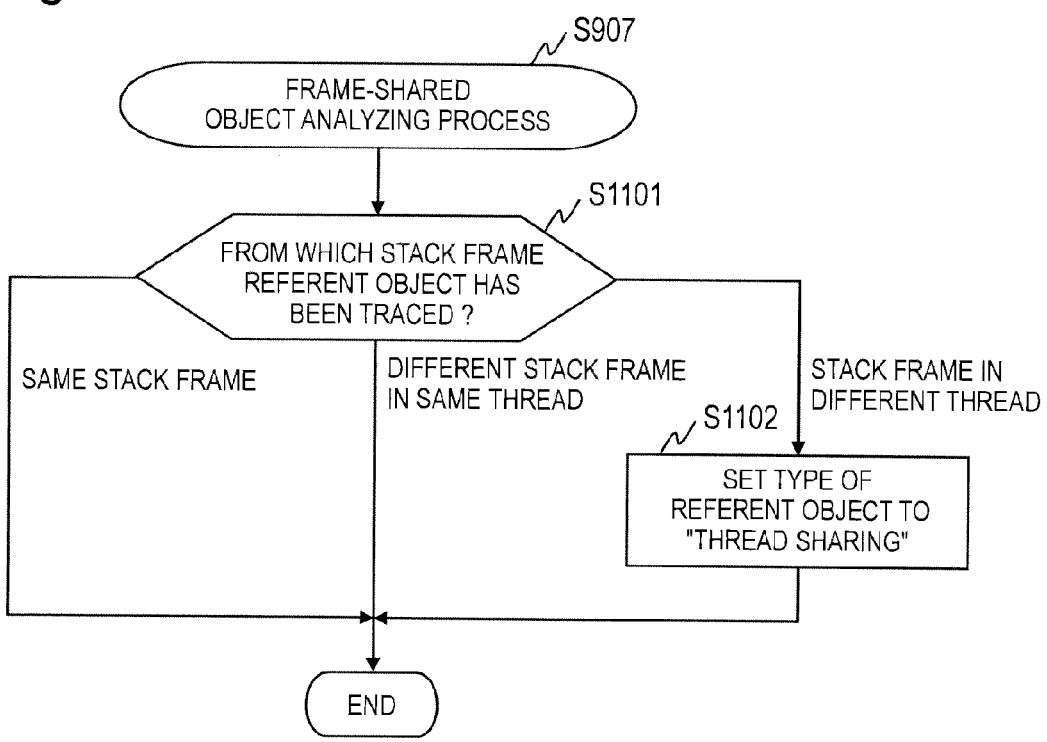
FIG. 11 is a flowchart illustrating the steps of a frame-shared object analyzing process according to the embodiment of this invention.

FIG. 11 is a flowchart illustrating the steps of the frame-shared object analyzing process according to the embodiment of this invention. In Step 907 of FIG. 9, the memory usage calculation part 324 executes this process.

First, in Step 1101, the memory usage calculation part 324 determines from which stack frame the referent object to be processed has been traced (S1101). In other words, the memory usage calculation part 324 compares the stack frame of the tracing source (reference source) at the time of executing the current object analyzing process with the stack frame of the tracing source at the time of executing the object analyzing process in the past.

When the referent object is an object that has already been traced from the same stack frame or when the referent object is an object that has already been traced from a different stack frame in the same thread, the memory usage calculation part 324 does not change the object type of the referent object.

When the referent object is an object that has already been traced from a stack frame in a different thread, the memory usage calculation part 324 sets (changes) the object type of the referent object to "Thread Sharing" (S1102).

Through the processes described above, when the object type of the referent object is "Frame Sharing", the memory usage calculation part 324 sets (changes) the object type of the referent object, depending on from which stack frame the referent object has been traced.

[Object Type of Each Object Under Object Analyzing Process]

Subsequently, a description is given of how the object type that is set for each object stored in the object storage area 341 under the object analyzing process illustrated in FIG. 9 changes.

Figure 12:
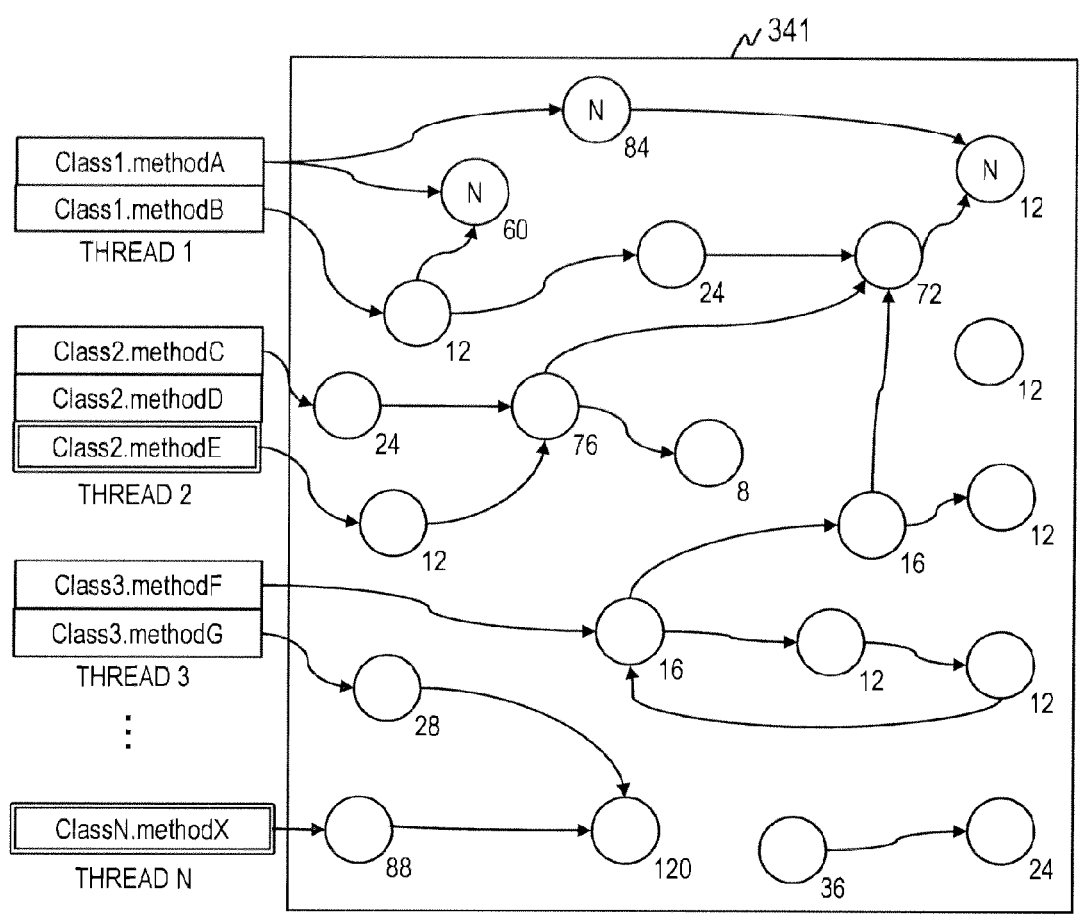
FIG. 12 is a diagram illustrating a first example of an object storage area in the object analyzing process according to the embodiment of this invention.

FIG. 12 is a diagram illustrating a first example of the object storage area 341 in the object analyzing process according to the embodiment of this invention. FIG. 12 illustrates object types that are set for individual objects when the object analyzing process for the stack frame that is executing Class1.methodA is complete.

Figure 13:
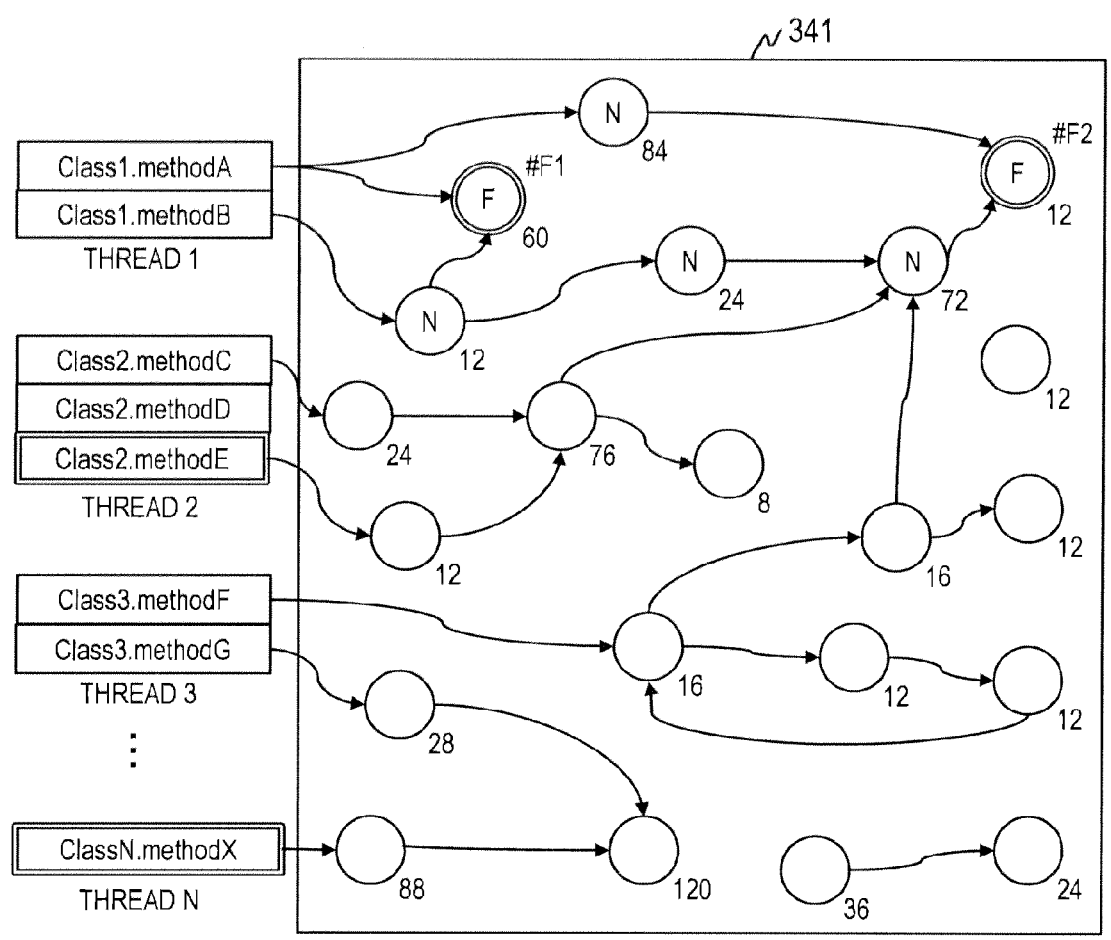
FIG. 13 is a diagram illustrating a second example of the object storage area in the object analyzing process according to the embodiment of this invention.

FIG. 13 is a diagram illustrating a second example of the object storage area 341 in the object analyzing process according to the embodiment of this invention. FIG. 13 illustrates object types that are set for individual objects when the object analyzing process up to the stack frame that is executing Class1.methodB is complete.

Figure 14:
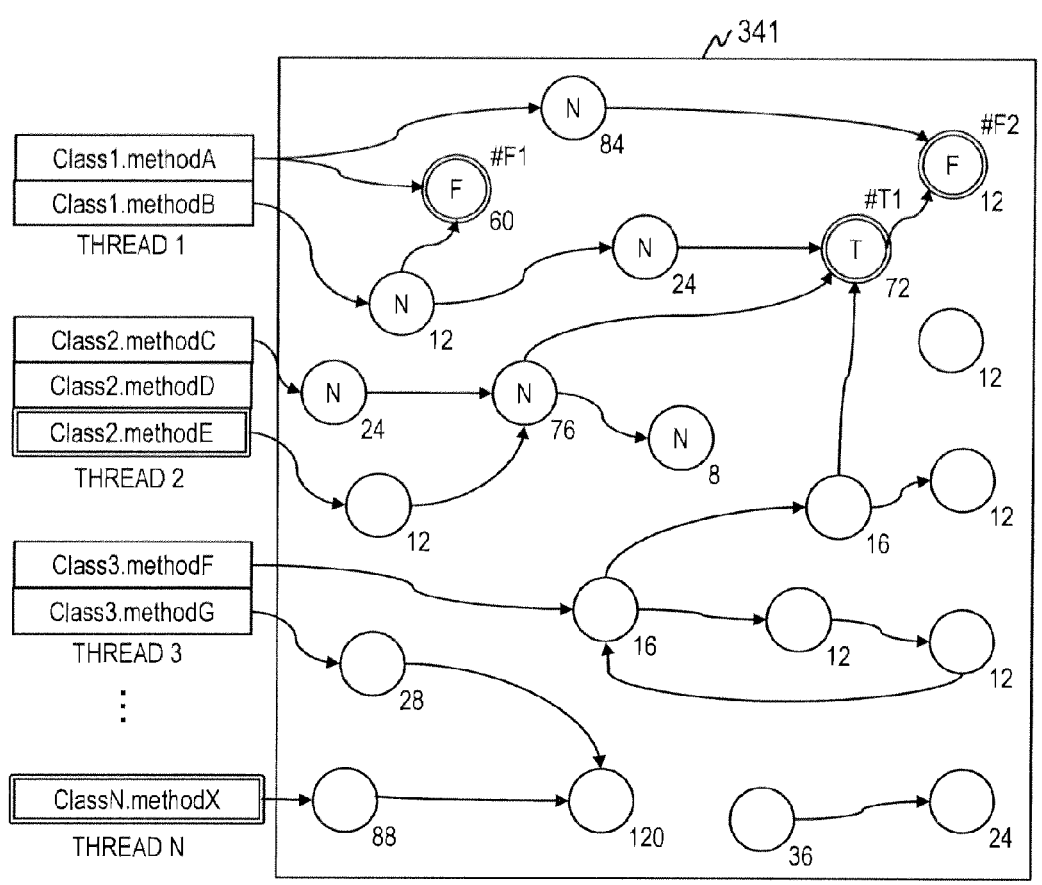
FIG. 14 is a diagram illustrating a third example of the object storage area in the object analyzing process according to the embodiment of this invention.

FIG. 14 is a diagram illustrating a third example of the object storage area 341 in the object analyzing process according to the embodiment of this invention. FIG. 14 illustrates object types that are set for individual objects when the object analyzing process up to the stack frame that is executing Class2.methodC is complete.

Figure 15:
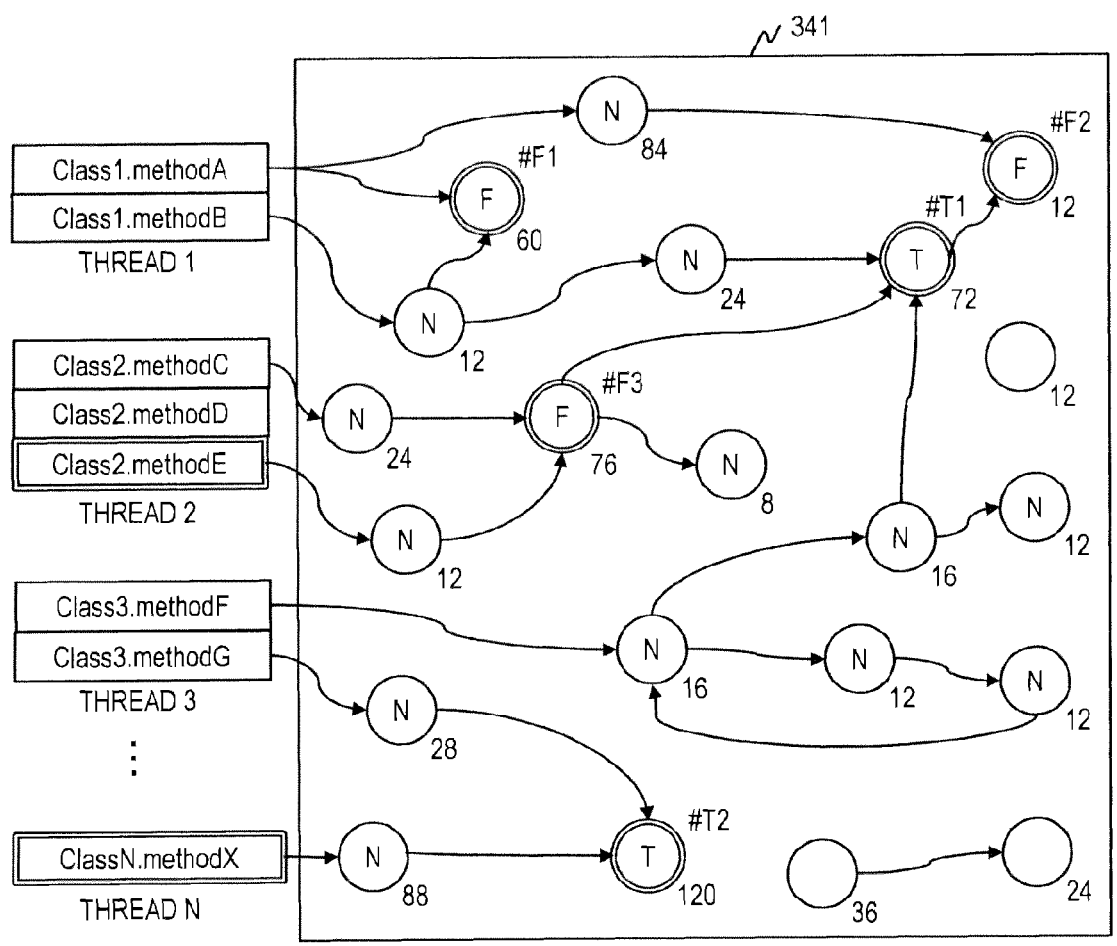
FIG. 15 is a diagram illustrating a fourth example of the object storage area in the object analyzing process according to the embodiment of this invention.

FIG. 15 is a diagram illustrating a fourth example of the object storage area 341 in the object analyzing process according to the embodiment of this invention. FIG. 15 illustrates object types that are set for individual objects when the object analyzing process for all stack frames is complete.

FIGS. 12 to 15 illustrate each object by a circle. The type of an object without a letter written inside the circle is "Unanalyzed". The type of an object with the letter "N" is "Necessary". The type of an object with the letter "F" is "Frame Sharing". The type of an object with the letter "T" is "Thread Sharing".

Characters starting at #F affixed to the upper right of an object indicate the frame-shared memory information ID 401 (see FIG. 4). Characters starting at #T indicate the thread-shared memory information ID 501 (see FIG. 5). Further, a numeral affixed to the lower right of an object indicates the memory usage of the object.

A stack frame indicated by a double-lined frame (for example, Class2.methodE) is a fixed stack frame (for example, system program). The other stack frames (for example, Class1.methodA) are each a variable stack frame (for example, user program). In other words, stack frames may include a fixed stack frame and a variable stack frame. Further, the type of a stack frame may be used as a condition for selection or determination such as a determination (S2904) of a condition for canceling a thread control process to be described later with reference to FIG. 29. For example, a thread to be controlled may be canceled when memory shortage occurs in a variable stack frame.

Then, as illustrated in FIG. 15, individual objects in the object storage area 341 are classified into objects with the letter F or T which are used in an overlapping manner (overlapping objects, overlapping resources) in a program that is executed thread by thread (threads 1 to N in this case), objects with the letter N which are not used in an overlapping manner in principle (non-overlapping objects, non-overlapping resources), and other objects. The overlapping objects include an object with the letter F (object that is shared by a plurality of different processes that are executed in the same thread), and an object the letter T (object shared by a plurality of different threads).

When the processes of Steps 803 to 808 in FIG. 8 are executed based on the types of the individual objects illustrated in FIG. 15, the frame-proprietary memory information table 342a of FIG. 3, the frame-shared memory information table 342b of in FIG. 4, and the thread-shared memory information table 342c of FIG. 5 are generated.

Figure 16:
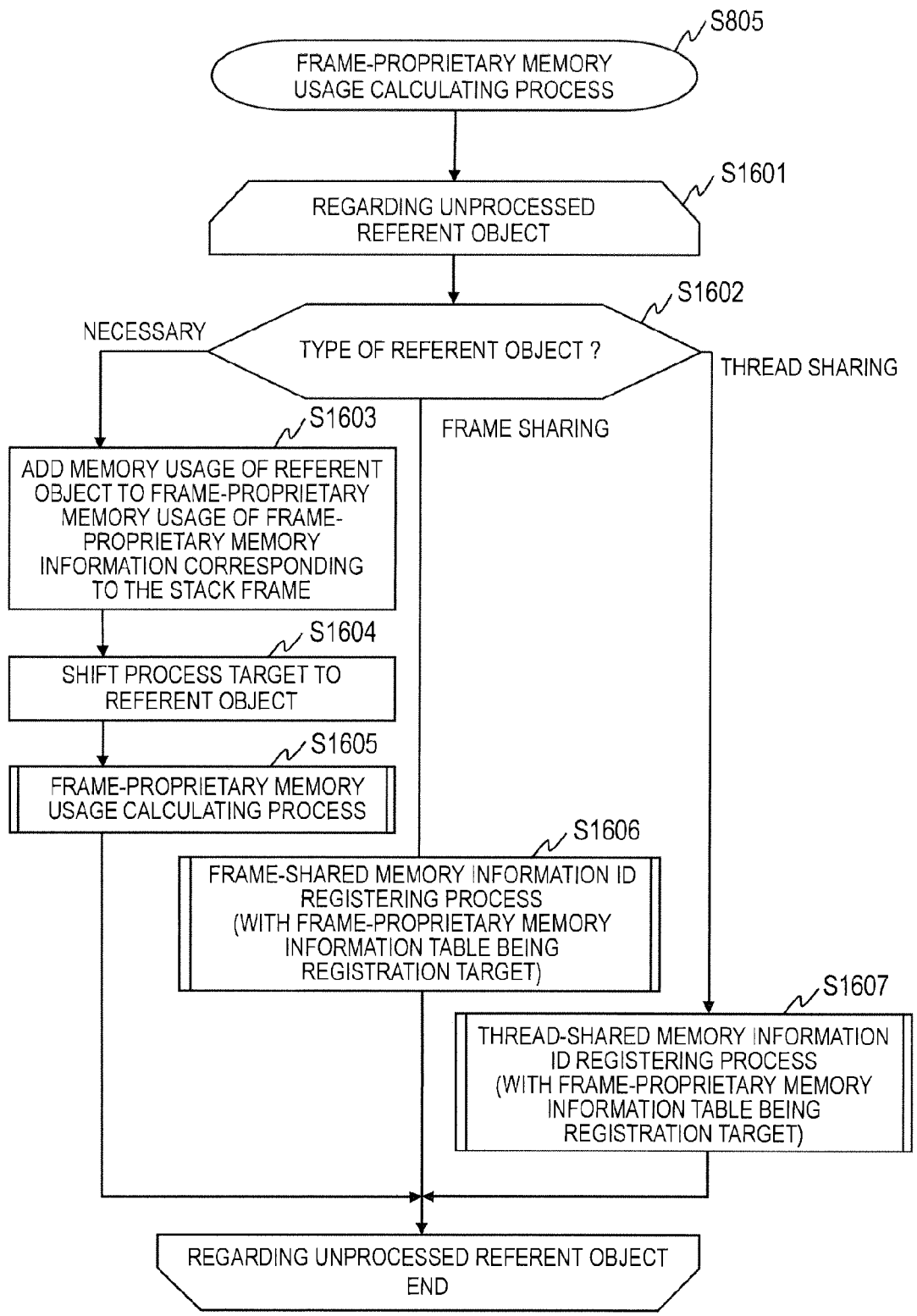
FIG. 16 is a flowchart illustrating the steps of a process of calculating the usage of a frame-proprietary memory according to the embodiment of this invention.

FIG. 16 is a flowchart illustrating the steps of a process of calculating the usage of a frame-proprietary memory according to the embodiment of this invention. In Step 805 of FIG. 8, the memory usage calculation part 324 executes this process to calculate the usage of a frame-proprietary memory in a predetermined stack frame (hereinafter referred to as "stack frame S" in the description of this process).

First, in Step 1601, the memory usage calculation part 324 executes the processes of Steps 1602 to 1607 for an unprocessed referent object. In other words, the memory usage calculation part 324 executes the processes of Steps 1602 to 1607 for every referent object in the stack frame S.

In Step 1602, the memory usage calculation part 324 determines the object type of an unprocessed referent object (S1602).

When the object type of the unprocessed referent object is "Necessary", the memory that is used by the unprocessed referent object is an proprietary memory of the stack frame S. Therefore, the memory usage calculation part 324 adds the memory usage of the unprocessed referent object to the frame-proprietary memory usage 304 of the frame-proprietary memory information corresponding to the stack frame S stored in the frame-proprietary memory information table 342a (S1603). Then, the memory usage calculation part 324 shifts the process target to a referent object of the unprocessed referent object (S1604). Then, the memory usage calculation part 324 recursively executes the frame-proprietary memory usage calculating process (FIG. 16) on the shifted referent object (S1605).

When the object type of the unprocessed referent object is "Frame Sharing", the memory that is used by the unprocessed referent object is a memory shared by the stack frame S and another stack frame, in other words, a frame-shared memory. Accordingly, the memory usage calculation part 324 executes a frame-shared memory information ID registering process (registration target is the frame-proprietary memory information table 342a) (S1606). Thereafter, the memory usage calculation part 324 returns to Step 1601 to shift the process target to an unprocessed referent object different from the current referent object. The details of the frame-shared memory information ID registering process are given later with reference to FIG. 17.

When the object type of the unprocessed referent object is "Thread Sharing", the memory that is used by the unprocessed referent object is a memory shared by a thread associated with the stack frame S and another thread, in other words, a thread-shared memory. Accordingly, the memory usage calculation part 324 executes a thread-shared memory information ID registering process (registration target is the frame-proprietary memory information table 342a) (S1607). Thereafter, the memory usage calculation part 324 returns to Step 1601 to shift the process target to an unprocessed referent object different from the current referent object. The details of the thread-shared memory information ID registering process are given later with reference to FIG. 18.

Through the processes described above, the memory usage calculation part 324 calculates the frame-proprietary memory usage 304 of the stack frame S while recursively tracing object reference in the stack frame S.

For example, in FIG. 15, the frame-proprietary memory usage of a stack frame indicated by Class1.methodB of thread 1 is "36", which is the sum of the memory usage of "12" of the referent object whose object type is "Necessary", in other words, the referent object of this stack frame, and the memory usage of "24" of a referent object of this referent object.

Figure 17:
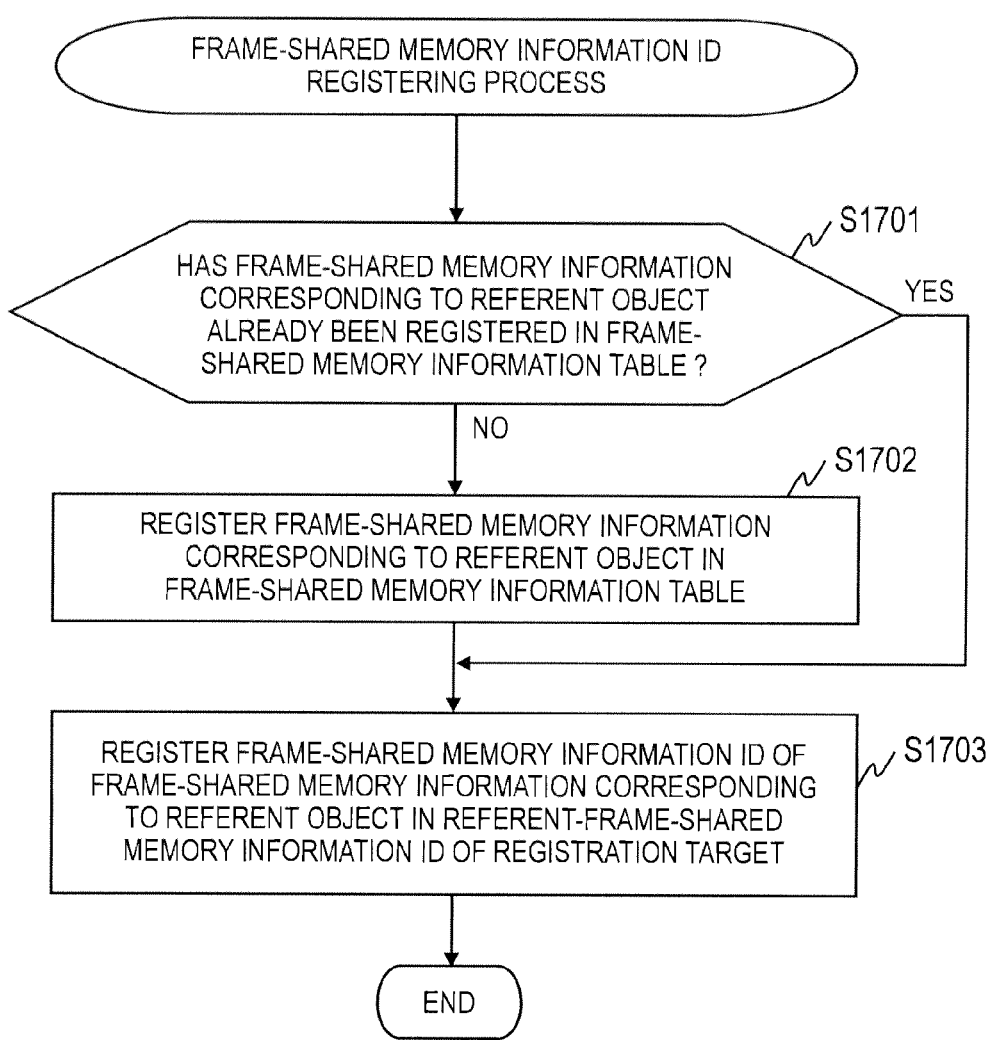
FIG. 17 is a flowchart illustrating the steps of a frame-shared memory information ID registering process according to the embodiment of this invention.

FIG. 17 is a flowchart illustrating the steps of the frame-shared memory information ID registering process according to the embodiment of this invention.

The memory usage calculation part 324 executes this process to register, in a registration target table, the frame-shared memory information ID of a referent object whose object type is "Frame Sharing" (hereinafter referred to as "referent object FO" in the description of this process). The registration target table is any one of the frame-proprietary memory information table 342a, the frame-shared memory information table 342b, and the thread-shared memory information table 342c.

First, in Step 1701, the memory usage calculation part 324 determines whether or not frame-shared memory information corresponding to the referent object FO has already been registered in the frame-shared memory information table 342b (S1701). Specifically, the memory usage calculation part 324 makes this determination by comparing the address of the object that is the root of the reference relationship of the referent object FO with the address 402 of each frame-shared memory information registered in the frame-shared memory information table 342b. When the frame-shared memory information corresponding to the referent object FO is registered (YES at S1701), the memory usage calculation part 324 proceeds to Step 1703.

On the other hand, when the frame-shared memory information corresponding to the referent object FO is not registered (NO at S1701), the memory usage calculation part 324 registers the frame-shared memory information corresponding to the referent object FO in the frame-shared memory information table 342b (S1702). Specifically, the memory usage calculation part 324 registers the frame-shared memory information ID 401, the address 402, the class name 403, and the frame-shared memory usage 404 (having an initial value of 0).

In Step 1703, the memory usage calculation part 324 sets (registers) the frame-shared memory information ID 401 of the frame-shared memory information corresponding to the referent object FO in the referent-frame-shared memory information ID of the registration target table (S1703).

In Step 1703, specifically, the memory usage calculation part 324 first acquires the frame-shared memory information ID 401 of the frame-shared memory information corresponding to the referent object FO from the frame-shared memory information table 342b. Then, the memory usage calculation part 324 sets the acquired frame-shared memory information ID 401 in the referent-frame-shared memory information ID of the registration target table.

In other words, when the registration target table is the frame-proprietary memory information table 342a, as in Step 1606 of FIG. 16, the memory usage calculation part 324 sets the acquired frame-shared memory information ID 401 in the referent-frame-shared memory information ID 305 of the frame-proprietary memory information corresponding to the stack frame S stored in the frame-proprietary memory information table 342a. When the registration target table is the frame-shared memory information table 342b, as in Step 1907 of FIG. 19, the memory usage calculation part 324 sets the acquired frame-shared memory information ID 401 in the referent-frame-shared memory information ID 405 of the frame-shared memory information F. When the registration target table is the thread-shared memory information table 342c, as in Step 2007 of FIG. 20, the memory usage calculation part 324 sets the acquired frame-shared memory information ID 401 in the referent-frame-shared memory information ID 505 of the thread-shared memory information T.

Through the processes described above, the memory usage calculation part 324 registers the frame-shared memory information ID of the referent object FO that is using the frame-shared memory in the registration target table.

Figure 18:
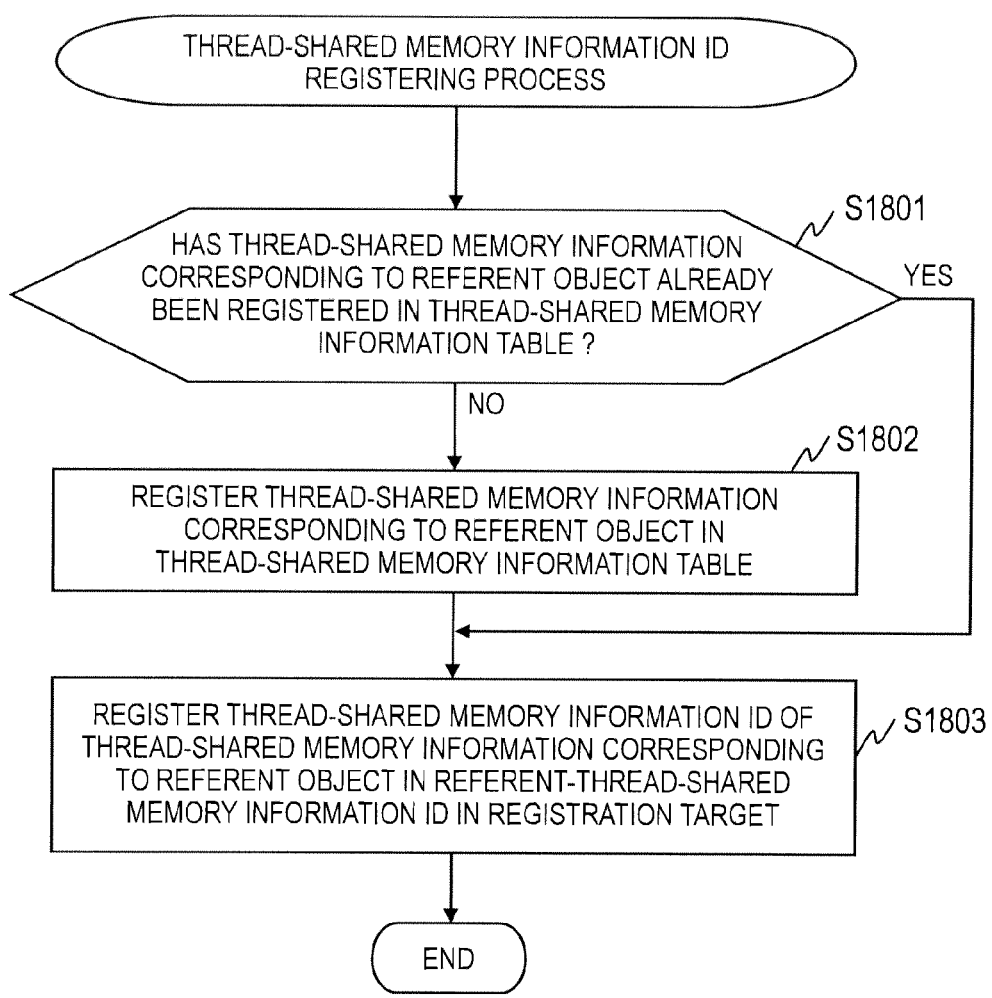
FIG. 18 is a flowchart illustrating the steps of a thread-shared memory information ID registering process according to the embodiment of this invention.

FIG. 18 is a flowchart illustrating the steps of the thread-shared memory information ID registering process according to the embodiment of this invention.

The memory usage calculation part 324 executes this process to register, in a registration target table, the thread-shared memory information ID of a referent object whose object type is "Thread Sharing" (hereinafter referred to as "referent object SO" in the description of this process). The registration target table is any one of the frame-proprietary memory information table 342a, the frame-shared memory information table 342b, and the thread-shared memory information table 342c.

First, in Step 1801, the memory usage calculation part 324 determines whether or not thread-shared memory information corresponding to the referent object SO has already been registered in the thread-shared memory information table 342c (S1801). Specifically, the memory usage calculation part 324 makes this determination by comparing the address of the object that is the root of the reference relationship of the referent object SO with the address 502 of each thread-shared memory information registered in the thread-shared memory information table 342c. When the thread-shared memory information corresponding to the referent object SO is registered (YES at S1801), the memory usage calculation part 324 proceeds to Step 1803.

On the other hand, when the thread-shared memory information corresponding to the referent object SO is not registered (NO at S1801), the memory usage calculation part 324 registers the thread-shared memory information corresponding to the referent object SO in the thread-shared memory information table 342c (S1802). Specifically, the memory usage calculation part 324 registers the thread-shared memory information ID 501, the address 502, the class name 503, and the thread-shared memory usage 504 (having an initial value of 0).

In Step 1803, the memory usage calculation part 324 sets (registers) the thread-shared memory information ID 501 of the thread-shared memory information corresponding to the referent object SO in the referent-thread-shared memory information ID of the registration target (S1803).

In Step 1803, specifically, the memory usage calculation part 324 first acquires the thread-shared memory information ID 501 of the thread-shared memory information corresponding to the referent object SO from the thread-shared memory information table 342c. Then, the memory usage calculation part 324 sets the acquired thread-shared memory information ID 501 in the referent-frame-shared memory information ID of the registration target table.

In other words, when the registration target table is the frame-proprietary memory information table 342a, as in Step 1607 of FIG. 16, the memory usage calculation part 324 sets the acquired thread-shared memory information ID 501 in the referent-thread-shared memory information ID 306 of the frame-proprietary memory information corresponding to the stack frame S stored in the frame-proprietary memory information table 342a. When the registration target table is the frame-shared memory information table 342b, as in Step 1908 of FIG. 19, the memory usage calculation part 324 sets the acquired thread-shared memory information ID 501 in the referent-thread-shared memory information ID 406 of the frame-shared memory information F. When the registration target table is the thread-shared memory information table 342c, as in Step 2008 of FIG. 20, the memory usage calculation part 324 sets the acquired thread-shared memory information ID 501 in the referent-thread-shared memory information ID 506 of the thread-shared memory information T.

Through the processes described above, the memory usage calculation part 324 registers the thread-shared memory information ID of the referent object SO that is using the thread-shared memory in the registration target table.

Figure 19:
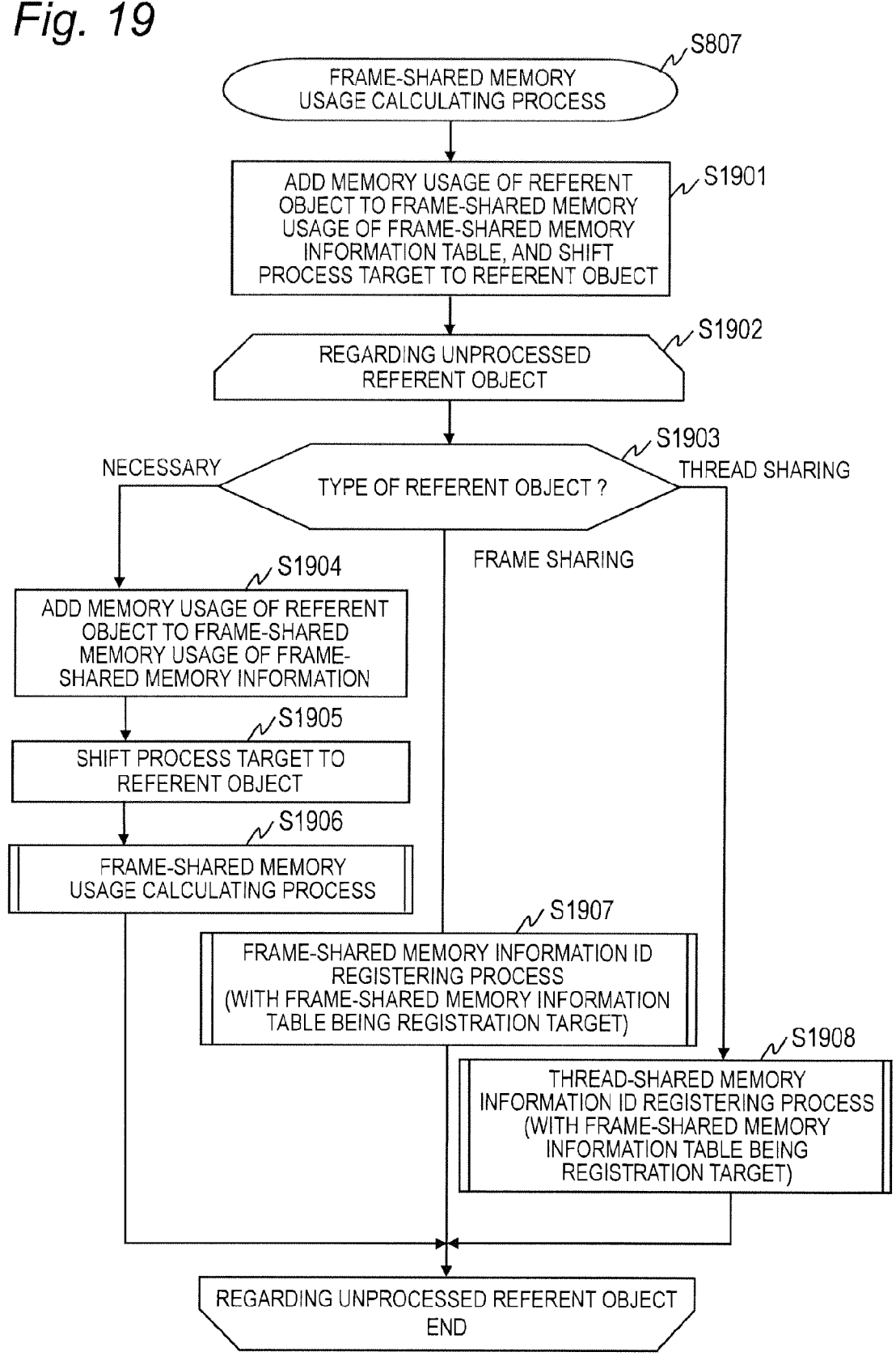
FIG. 19 is a flowchart illustrating the steps of a process of calculating the usage of a frame-shared memory according to the embodiment of this invention.

FIG. 19 is a flowchart illustrating the steps of a process of calculating the usage of a frame-shared memory according to the embodiment of this invention. In Step 807 of FIG. 8, the memory usage calculation part 324 executes this process to calculate the usage of a frame-shared memory of predetermined frame-shared memory information (hereinafter referred to as "frame-shared memory information F" in the description of this process).

First, in Step 1901, the memory usage calculation part 324 adds the memory usage of a referent object indicated by the address 402 of the frame-shared memory information F (hereinafter referred to as "referent object FR" in the description of this process) to the frame-shared memory usage 404 of the frame-shared memory information F, and shifts the process target to the referent object FR.

Then, in Step 1902, the memory usage calculation part 324 executes the processes of Steps 1903 to 1908 for an unprocessed referent object. In other words, the memory usage calculation part 324 executes the processes of Steps 1903 to 1908 for every referent object in the referent object FR.

In Step 1903, the memory usage calculation part 324 determines the object type of an unprocessed referent object (S1903).

When the object type of the unprocessed referent object is "Necessary", the memory that is used by the unprocessed referent object is a frame-shared memory similarly to the referent object FR. Therefore, the memory usage calculation part 324 adds the memory usage of the unprocessed referent object to the frame-shared memory usage 404 of the frame-shared memory information F (S1904). Then, the memory usage calculation part 324 shifts the process target to a referent object of the unprocessed referent object (S1905). Then, the memory usage calculation part 324 recursively executes the frame-shared memory usage calculating process (FIG. 19) on the shifted referent object (S1906).

When the object type of the unprocessed referent object is "Frame Sharing", the memory that is used by the unprocessed referent object is a frame-shared memory different from the memory used by the referent object FR. Accordingly, the memory usage calculation part 324 executes a frame-shared memory information ID registering process (registration target is the frame-shared memory information table 342b) (S1907). Thereafter, the memory usage calculation part 324 returns to Step 1901 to shift the process target to an unprocessed referent object different from the current referent object. The details of the frame-shared memory information ID registering process are as given above with reference to FIG. 17.

When the object type of the unprocessed referent object is "Thread Sharing", the memory that is used by the unprocessed referent object is a thread-shared memory. Accordingly, the memory usage calculation part 324 executes a thread-shared memory information ID registering process (registration target is the frame-shared memory information table 342b) (S1908). Thereafter, the memory usage calculation part 324 returns to Step 1901 to shift the process target to an unprocessed referent object different from the current referent object. The details of the thread-shared memory information ID registering process are as given above with reference to FIG. 18.

Through the processes described above, the memory usage calculation part 324 calculates the frame-shared memory usage 404 of the frame-shared memory information F while recursively tracing object reference in the referent object FR indicated by the address 402 of the frame-shared memory information F.

For example, in FIG. 15, the frame-shared memory usage of frame-shared memory information indicated by the frame-shared memory information ID of "#F3" is "84", which is the sum of the memory usage of "76" of the referent object of this frame-shared memory information, and the memory usage of "8" of a referent object which is the referent of this referent object and whose object type is "Necessary".

Figure 20:
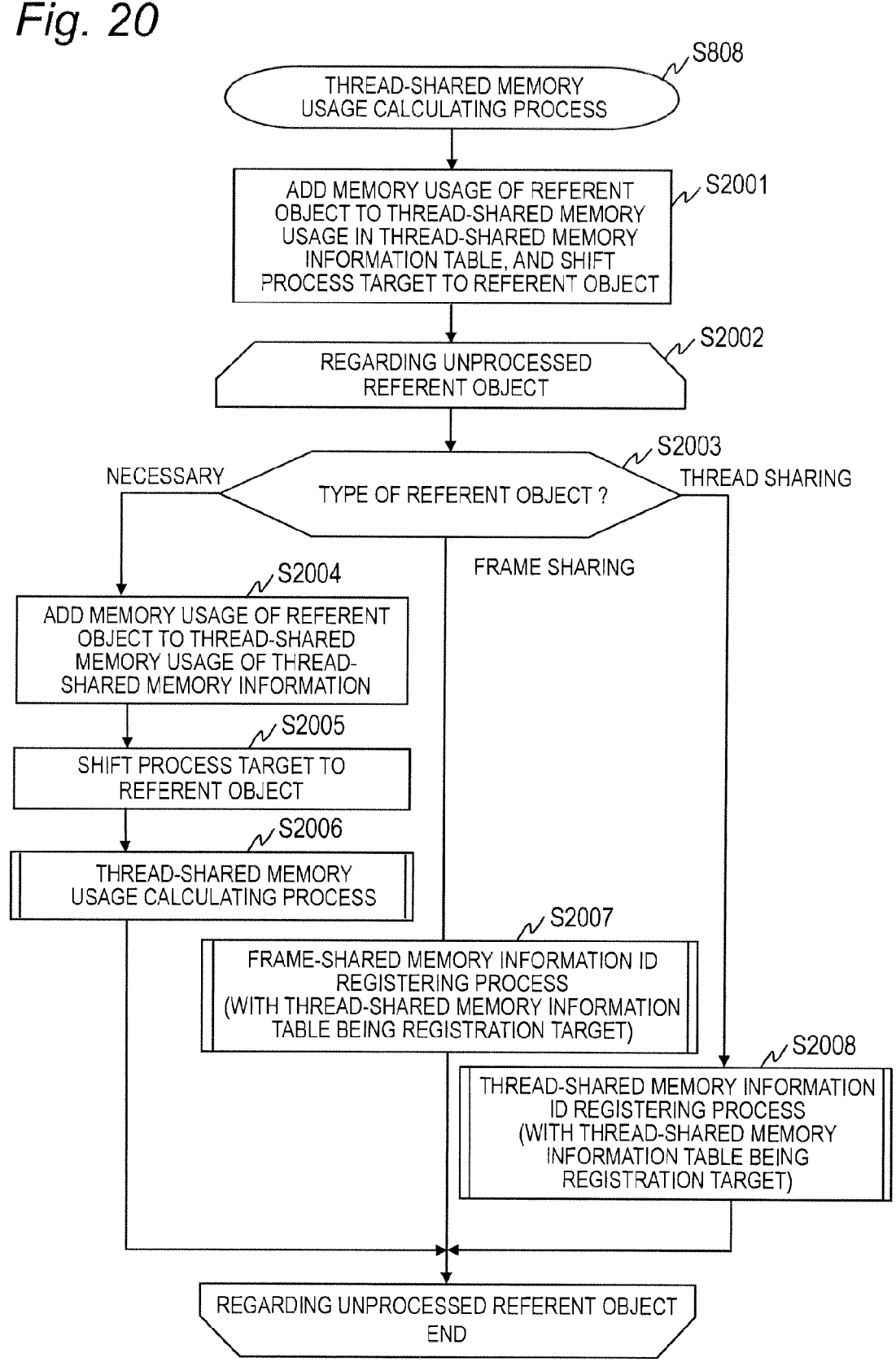
FIG. 20 is a flowchart illustrating the steps of a process of calculating the usage of a thread-shared memory according to the embodiment of this invention.

FIG. 20 is a flowchart illustrating the steps of a process of calculating the usage of a thread-shared memory according to the embodiment of this invention. In Step 808 of FIG. 8, the memory usage calculation part 324 executes this process to calculate the usage of a thread-shared memory of predetermined thread-shared memory information (hereinafter referred to as "thread-shared memory information T" in the description of this process).

First, in Step 2001, the memory usage calculation part 324 adds the memory usage of a referent object indicated by the address 502 of the thread-shared memory information T (hereinafter referred to as "referent object TR" in the description of this process) to the thread-shared memory usage 504 of the thread-shared memory information T, and shifts the process target to the referent object TR (S2001).

Thereafter, in Step 2002, the memory usage calculation part 324 executes the processes of Steps 2003 to 2008 for an unprocessed referent object. In other words, the memory usage calculation part 324 executes the processes of Steps 2003 to 2008 for every referent object in the referent object TR.

In Step 2003, the memory usage calculation part 324 determines the object type of an unprocessed referent object (S2003).

When the object type of the unprocessed referent object is "Necessary", the memory that is used by the unprocessed referent object is a thread-shared memory similarly to the referent object TR. Therefore, the memory usage calculation part 324 adds the memory usage of the unprocessed referent object to the thread-shared memory usage 504 of the thread-shared memory information T (S2004). Then, the memory usage calculation part 324 shifts the process target to a referent object of the unprocessed referent object (S2005). Then, the memory usage calculation part 324 recursively executes the thread-shared memory usage calculating process (FIG. 20) on the shifted referent object (S2006).

When the object type of the unprocessed referent object is "Frame Sharing", the memory that is used by the unprocessed referent object is a frame-shared memory. Accordingly, the memory usage calculation part 324 executes a frame-shared memory information ID registering process (registration target is the thread-shared memory information table 342c) (S2007). Thereafter, the memory usage calculation part 324 returns to Step 2001 to shift the process target to an unprocessed referent object different from the current referent object. The details of the frame-shared memory information ID registering process are as given above with reference to FIG. 17.

When the object type of the unprocessed referent object is "Thread Sharing", the memory that is used by the unprocessed referent object is a thread-shared memory different from the memory used by the referent object TR. Accordingly, the memory usage calculation part 324 executes a thread-shared memory information ID registering process (registration target is the thread-shared memory information table 342c) (S2008). Thereafter, the memory usage calculation part 324 returns to Step 2001 to shift the process target to an unprocessed referent object different from the current referent object. The details of the thread-sharing memory information ID registering process are as given above with reference to FIG. 18.

Through the processes described above, the memory usage calculation part 324 calculates the thread-shared memory usage 504 of the thread-shared memory information T while recursively tracing object reference in the referent object TR indicated by the address 502 of the thread-shared memory information T.

For example, in FIG. 15, the thread-shared memory usage of thread-shared memory information indicated by the thread-shared memory information ID of "#T1" is "72", which is the memory usage of the referent object of this thread-shared memory information.

[Example of Calculation of Purpose-Based Memory Usage]

Hereinafter, an example of the purpose-based memory usage calculating process in Step 810 of FIG. 8 is described with reference to FIGS. 21 to 28.

[1. Calculation of Total Memory Usage of Specific Thread]

Figure 21:
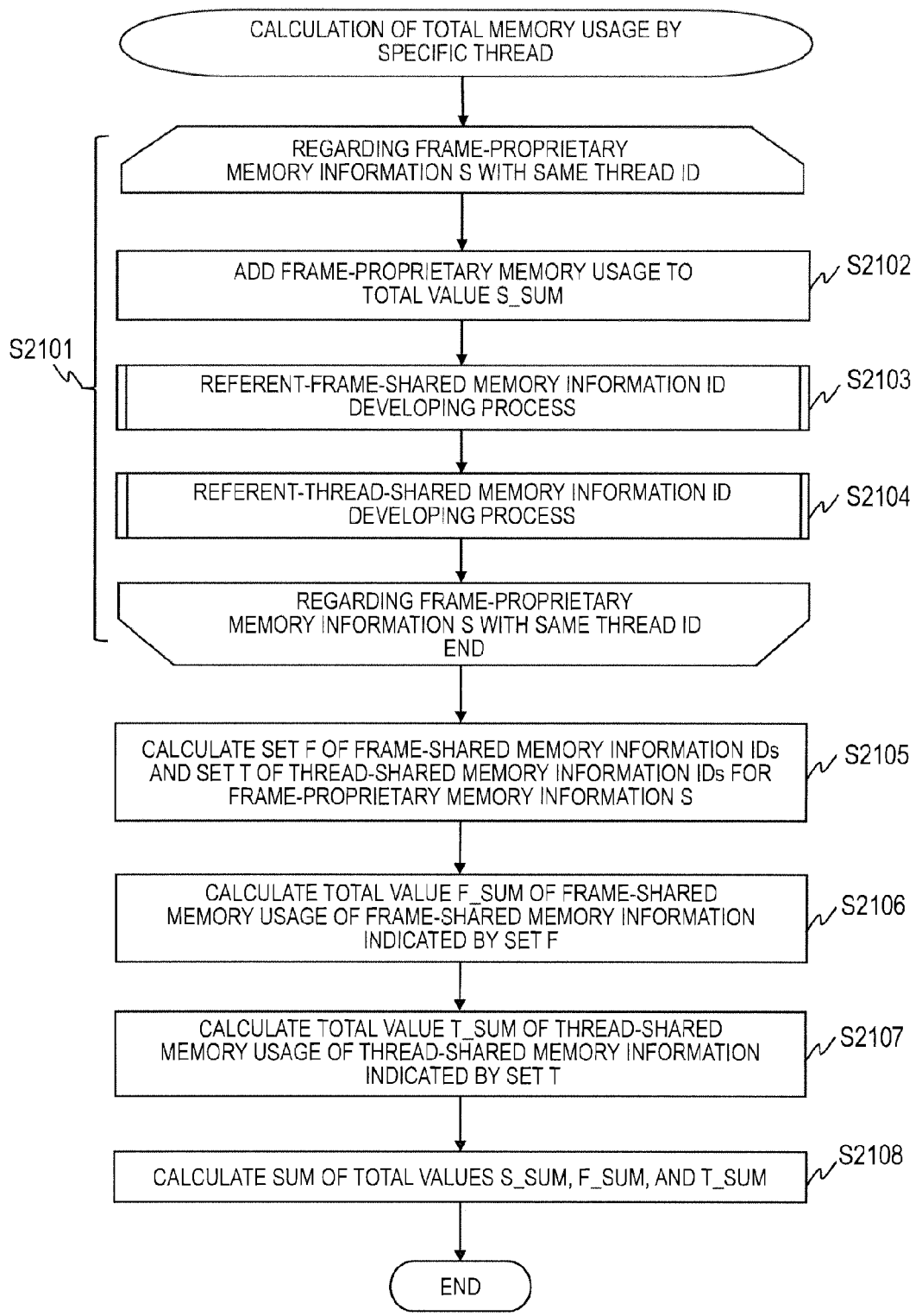
FIG. 21 is a flowchart illustrating the steps of a process of calculating the total memory usage of a specific thread according to the embodiment of this invention.

FIG. 21 is a flowchart illustrating the steps of a process of calculating the total memory usage of a specific thread according to the embodiment of this invention.

The memory usage calculation part 324 can calculate the total memory usage of a specific thread by executing this process. When the proprietary memory usage of the specific thread (see FIG. 25) and the shared memory usage of the specific thread (see FIG. 26) have already been calculated, the total memory usage can be calculated as the sum of the proprietary memory usage and the shared memory usage.

The total memory usage of a specific thread may be calculated as the sum of the following total values S_SUM, F_SUM, and T_SUM.

S_SUM: Total value of the frame-proprietary memory usage 304 of frame-proprietary memory information S with the same thread ID 302 that is registered in the frame-proprietary memory information table 342a.

F_SUM: Total value of the frame-shared memory usage 404 of frame-shared memory information indicated by a set F of frame-shared memory information IDs 401 that are directly or indirectly referred to from the referent-frame-shared memory information ID 305 or the referent-thread-shared memory information ID 306 of frame-proprietary memory information S.

T_SUM: Total value of the thread-shared memory usage 504 of thread-shared memory information indicated by a set T of thread-shared memory information IDs 501 that are directly or indirectly referred to from the referent-frameshared memory information ID 305 or the referent-thread-shared memory information ID 306 of frame-proprietary memory information S.

The following describes the flowchart of FIG. 21. The following description is given of a case where the total memory usage of the thread with the thread ID 302 (see FIG. 3) of "#1" is calculated, as a specific example.

First, in Step 2101, the memory usage calculation part 324 repeats the processes of Steps 2102 to 2104 on each frame-proprietary memory information with the same thread ID 302 of "#1" (hereinafter referred to as "frame-proprietary memory information S" in the description of this process). The frame-proprietary memory information S in the specific example indicates frame-proprietary memory information with the frame-proprietary memory information ID 301 of "#1" and frame-proprietary memory information with the frame-proprietary memory information ID 301 of "#2" illustrated in FIG. 3.

In Step 2102, the memory usage calculation part 324 adds the memory usage of the frame-proprietary memory in the frame-proprietary memory information S to the total value S_SUM (S2102). In other words, the total value S_SUM is the sum "120" of the memory usage of "84" of the frame-proprietary memory with the frame-proprietary memory information ID 301 of "#1" and the memory usage of "36" of the frame-proprietary memory with the frame-proprietary memory information ID 301 of "#2".

In other words, in this Step 2102, the memory usage calculation part 324 determines an object to be exclusively used by a target thread (thread with the thread ID 302 of "#1" in this example; in other words, thread that is not used in an overlapping manner) based on the reference relationship of individual objects that are referred to by the target thread, and calculates the memory usage of this object.

In Step 2103, the memory usage calculation part 324 executes a referent-frame-shared memory information ID developing process on the referent-frame-shared memory information ID 305 of the frame-proprietary memory information S (S2103). Through the process of Step 2103, the memory usage calculation part 324 acquires information on the frame-shared memory information ID 401 or the thread-shared memory information ID 501 that is directly or indirectly referred to from the referent-frame-shared memory information ID 305 of the frame-proprietary memory information S. The details of the referent-frame-shared memory information ID developing process are given later with reference to FIG. 22.

In Step 2104, the memory usage calculation part 324 executes a referent-thread-shared memory information ID developing process on the referent-thread-shared memory information ID 306 of the frame-proprietary memory information S (S2104). Through the process of Step 2104, the memory usage calculation part 324 acquires information on the frame-shared memory information ID 401 or the thread-shared memory information ID 501 that is directly or indirectly referred to from the referent-thread-shared memory information ID 306 of the frame-proprietary memory information S. The details of the referent-thread-shared memory information ID developing process are given later with reference to FIG. 23.

In next Step 2105, the memory usage calculation part 324 calculates the set F of the frame-shared memory information IDs 401 and the set T of the thread-shared memory information IDs 501 for each frame-proprietary memory information S having the same thread ID 302 (S2105).

In other words, the memory usage calculation part 324 calculates the set F {"#F1", "#F2"} of the frame-shared memory information IDs 401 and the set T {"#T1"} of the thread-shared memory information IDs 501 that are directly or indirectly referred to from the referent-frame-shared memory information ID 305 or the referent-thread-shared memory information ID 306 of each frame-proprietary memory information S (see FIG. 24).

In Step 2105, the set F of frame-shared memory information IDs 401 and the set T of thread-shared memory information IDs 501 are calculated to prevent overlapping addition of the memory usage of the frame-shared memory and the thread-shared memory that are referred to by a plurality of stack frames or a plurality of threads to the total memory usage.

In other words, in this Step 2105, the memory usage calculation part 324 determines an object which is used in an overlapping manner based on the reference relationship of individual objects that are referred to by the target thread.

In next Step 2106, the memory usage calculation part 324 calculates the total value F_SUM of the frame-shared memory usage 404 of the frame-shared memory information indicated by the set F (S2106). In the above-mentioned specific example, the set F is {"#F1", "#F2"}. In Step 2106, therefore, the total value F_SUM is "72", which is the sum of the memory usage of "60" of the frame-shared memory specified by the frame-shared memory information ID 401 of "#F1" and the memory usage of "12" of the frame-shared memory specified by the frame-shared memory information ID 401 of "#F2".

In other words, in this Step 2106, the memory usage calculation part 324 calculates the size of a memory area (memory usage) storing an object shared (used in an overlapping manner) by different stack frames in the target thread among those objects that have been determined as being used in an overlapping manner in Step 2105.

In next Step 2107, the memory usage calculation part 324 calculates the total value T_SUM of the thread-shared memory usage 504 of the thread-shared memory information indicated by the set T (S2107). In the above-mentioned specific example, the set T is {"#T1"}. In Step 2107, therefore, the total value T_SUM is "72", which is the memory usage of the thread-shared memory specified by the thread-shared memory information ID 501 of "#T1".

In other words, in this Step 2107, the memory usage calculation part 324 calculates the size of a memory area storing an object shared (used in an overlapping manner) by a plurality of different threads (including the target thread) among those objects that have been determined as being used in an overlapping manner in Step 2105.

In Step 2108, the memory usage calculation part 324 calculates the sum of the total value S_SUM, the total value F_SUM, and the total value T_SUM (S2108). In the above-mentioned specific example, the total memory usage of the thread with the thread ID of "#1" becomes "264", which is the sum of "120", "72", and "72".

Through the processes described above, the memory usage calculation part 324 can calculate the total memory usage of a specific thread (here, thread with the thread ID 302 of "#1"). It is to be noted that the total memory usage of a thread is, in other words, the maximum memory release released when the thread is terminated.

Figure 22:
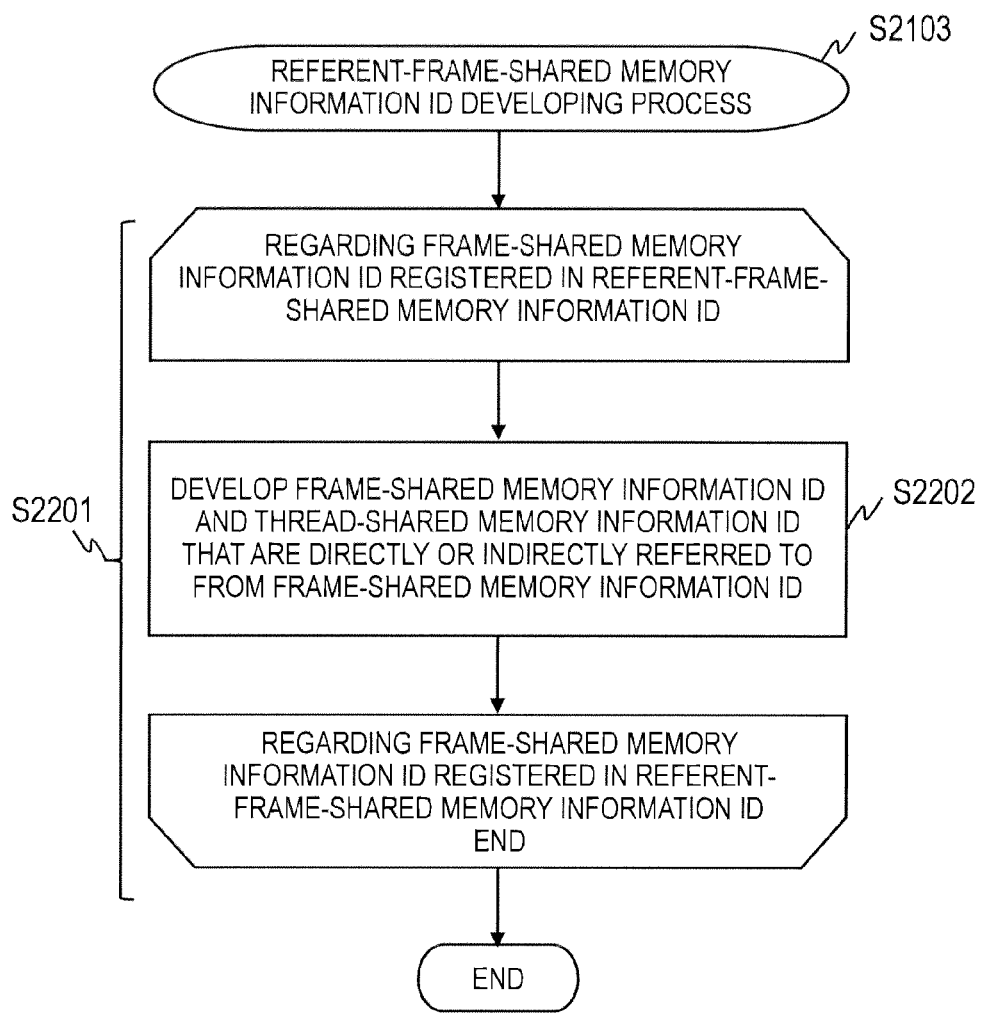
FIG. 22 is a flowchart illustrating the steps of a referent-frame-shared memory information ID developing process according to the embodiment of this invention.

FIG. 22 is a flowchart illustrating the steps of the referent-frame-shared memory information ID developing process according to the embodiment of this invention. In Step 2103 of FIG. 21, the memory usage calculation part 324 executes this process.

First, in Step 2201, the memory usage calculation part 324 executes the process of Step 2202 for each frame-shared memory information ID 401 registered in the referent-frame-shared memory information ID 305 (see FIG. 3) of the frame-proprietary memory information S to be processed.

In Step 2202, the memory usage calculation part 324 develops the frame-shared memory information ID 401 and the thread-shared memory information ID 501 that are directly or indirectly referred to from each frame-shared memory information ID 401 (2202).

Considered is a case where, for example, the frame-proprietary memory information ID 301 of the frame-proprietary memory information S to be processed is "#3" (see FIG. 3). In this case, "#F3" is registered in referent-frame-shared memory information ID 305 of the frame-proprietary memory information S in the frame-proprietary memory information table 342a. In the frame-shared memory information table 342b (see FIG. 4), "#T1" is registered in the referent-thread-shared memory information ID 406 of the frame-shared memory information having the frame-shared memory information ID 401 of "#F3". In the thread-shared memory information table 342c (see FIG. 5), "#F2" is registered in the referent-frame-shared memory information ID 505 of the thread-shared memory information having the thread-shared memory information ID 501 of "#T1".

This implies that the frame-shared memory corresponding to the frame-shared memory information having the frame-shared memory information ID 401 of "#F3" directly refers to the thread-shared memory corresponding to the thread-shared memory information having the thread-shared memory information ID 501 of "#T1". It is also implied that the frame-shared memory corresponding to the frame-shared memory information having the frame-shared memory information ID 401 of "#F3" indirectly refers to the frame-shared memory corresponding to the frame-shared memory information having the frame-shared memory information ID 401 of "#F2".

Through the processes described above, the memory usage calculation part 324 develops the frame-shared memory information ID 401 and the thread-shared memory information ID 501 that are directly or indirectly referred to from the frame-shared memory information ID 401 registered in the referent-frame-shared memory information ID 305 of the frame-proprietary memory information S to be processed. In other words, the memory usage calculation part 324 acquires the reference relationship between the referent-frame-shared memory of the frame-proprietary memory information S, and another frame-shared memory and another thread-shared memory.

Figure 23:
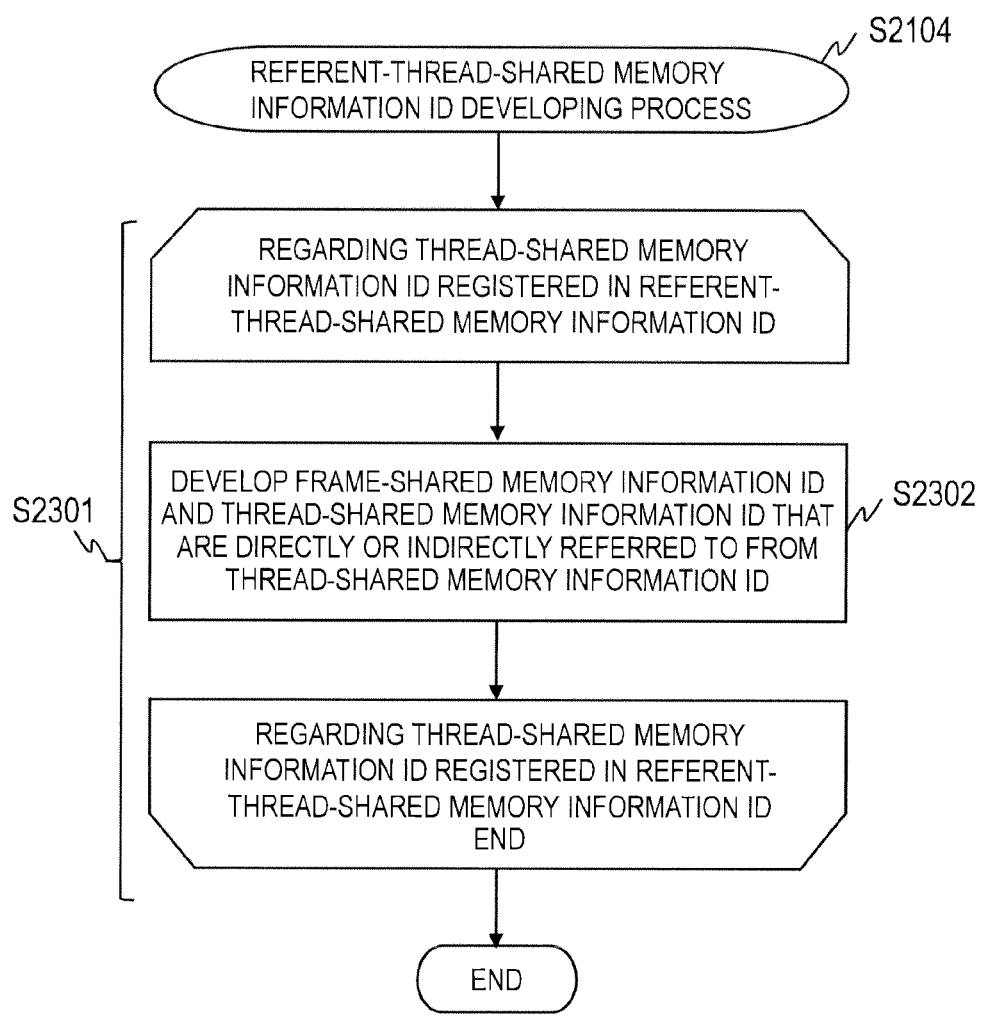
FIG. 23 is a flowchart illustrating the steps of a referent-thread-shared memory information ID developing process according to the embodiment of this invention.

FIG. 23 is a flowchart illustrating the steps of the referent-thread-shared memory information ID developing process according to the embodiment of this invention. In Step 2104 of FIG. 21, the memory usage calculation part 324 executes this process.

First, in Step 2301, the memory usage calculation part 324 executes the process of Step 2302 for each thread-shared memory information ID 501 registered in the referent-thread-shared memory information ID 306 (see FIG. 3) of the frame-proprietary memory information S to be processed.

In Step 2302, the memory usage calculation part 324 develops the frame-shared memory information ID 401 and the thread-shared memory information ID 501 that are directly or indirectly referred to from each thread-shared memory information ID 501 (2302).

Through the processes described above, the memory usage calculation part 324 develops the frame-shared memory information ID 401 and the thread-shared memory information ID 501 that are directly or indirectly referred to from the thread-shared memory information ID 501 registered in the referent-thread-shared memory information ID 306 of the frame-proprietary memory information S to be processed. In other words, the memory usage calculation part 324 acquires the reference relationship between the referent-thread-shared memory of the frame-proprietary memory information S, and the frame-shared memory and another thread-shared memory.

FIG. 24 is a diagram illustrating an example of the frame-proprietary memory information table 342a after development of the embodiment of this invention.

A referent-frame-shared memory information ID 805 and a referent-thread-shared memory information ID 806 in the frame-proprietary memory information table 342a after development illustrated in FIG. 24 respectively correspond to the referent-frame-shared memory information ID 305 and the referent-thread-shared memory information ID 306 in the frame-shared memory information table 342a illustrated in FIG. 3. It is to be noted that same reference numerals are given to the same components as illustrated in FIG. 3 to avoid redundant description thereof.

The referent-frame-shared memory information ID 805 is the referent-frame-shared memory information ID 305 developed through the referent-frame-shared memory information ID development process illustrated in FIG. 22. For example, "#F3→#T1→#F2" is registered in the referent-frame-shared memory information ID 805 with the frame-proprietary memory information ID 301 of "#3".

This implies that the frame-shared memory corresponding to the frame-shared memory information having the frame-shared memory information ID 401 of "#F3" directly refers to the thread-shared memory corresponding to the thread-shared memory information having the thread-shared memory information ID 501 of "#T1". It is also implied that the frame-shared memory corresponding to the frame-shared memory information having the frame-shared memory information ID 401 of "#F3" indirectly refers to the frame-shared memory corresponding to the frame-shared memory information having the frame-shared memory information ID 401 of "#F2".

The referent-thread-shared memory information ID 806 is the referent-thread-shared memory information ID 306 developed through the referent-thread-shared memory information ID development process illustrated in FIG. 23. For example, "#T1→#F2" is registered in the referent-thread-shared memory information ID 806 with the frame-proprietary memory information ID 301 of "#2".

This implies that the thread-shared memory corresponding to the thread-shared memory information having the thread-shared memory information ID 501 of "#T1" directly refers to the frame-shared memory corresponding to the frame-shared memory information having the frame-shared memory information ID 401 of "#F2".

[2. Calculation of Proprietary Memory Usage by Specific Thread]

Figure 25:
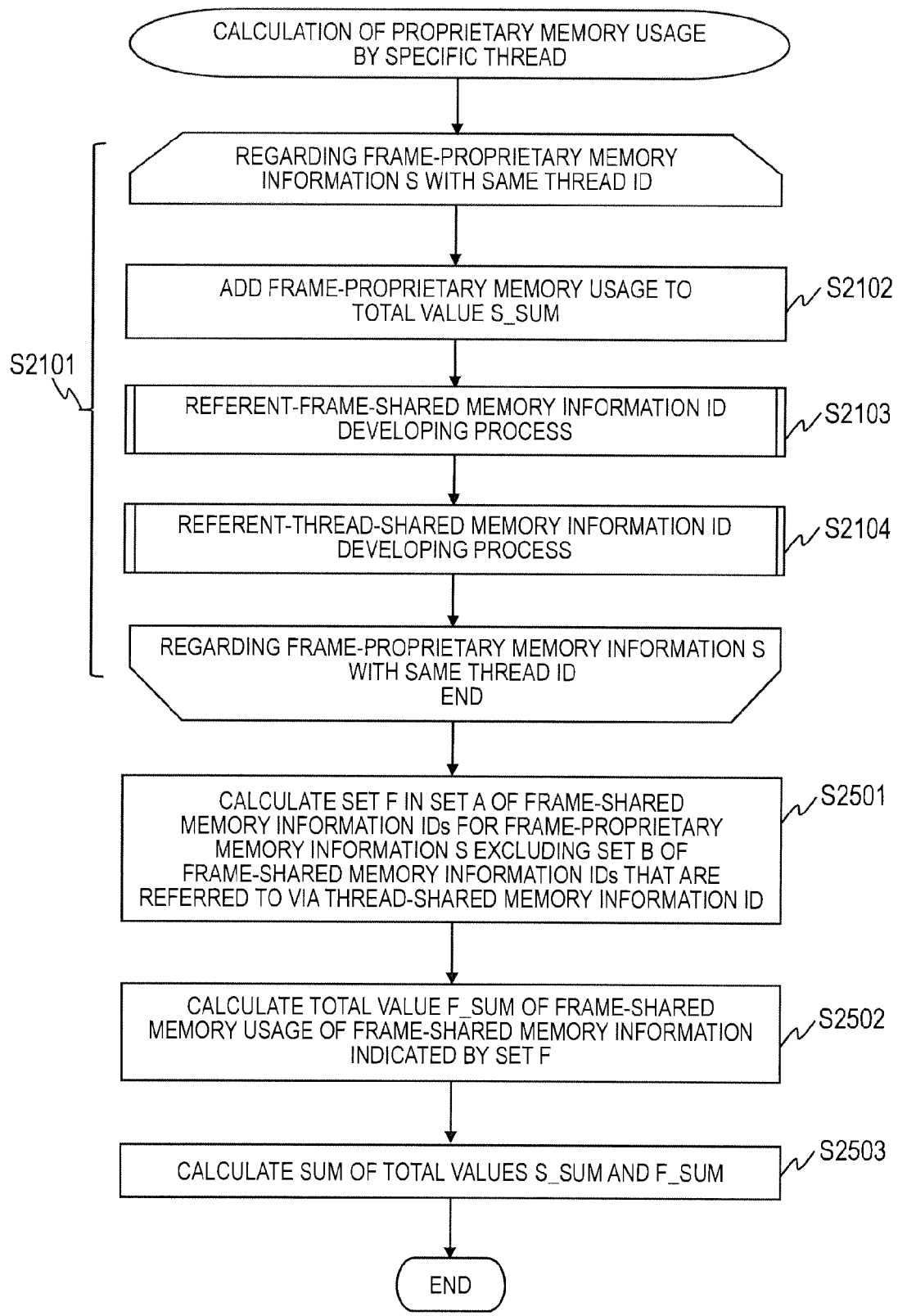
FIG. 25 is a flowchart illustrating the steps of a process of calculating a proprietary memory usage by a specific thread according to the embodiment of this invention.

FIG. 25 is a flowchart illustrating the steps of a process of calculating the proprietary memory usage by a specific thread according to the embodiment of this invention.

The memory usage calculation part 324 can calculate the proprietary memory usage by a specific thread by executing this process. When the total memory usage (see FIG. 21) and the shared memory usage (see FIG. 26) by a specific thread have already been calculated, the proprietary memory usage can be calculated as the difference between the total memory usage and the shared memory usage.

The proprietary memory usage by a specific thread may be calculated as the sum of the following total values S_SUM and F_SUM below.

S_SUM: Total value of the frame-proprietary memory usage 304 of the frame-proprietary memory information S having the same thread ID 302 registered in the frame-proprietary memory information table 342a.

F_SUM: Total value of the frame-shared memory usage 404 of frame-shared memory information indicated by a set F in a set A of frame-shared memory information IDs 401 that are directly or indirectly referred to from the referent-frame-shared memory information ID 305 or the referent-thread-shared memory information ID 306 of the frame-proprietary memory information S, excluding a set B of the frame-shared memory information IDs 401 that are referred to via the thread-shared memory information ID 501.

The following describes the flowchart of FIG. 25. The following description is given of a case where the proprietary memory usage by the thread with the thread ID 302 (see FIG. 3) of "#1" is calculated, as a specific example. The same reference numerals are given to the same components as illustrated in FIG. 21 to avoid redundant description thereof.

In Step 2501, the memory usage calculation part 324 calculates the set F in the set A of the frame-shared memory information IDs 401 for each frame-proprietary memory information S having the same thread ID 302, excluding the set B of the frame-shared memory information IDs 401 that are referred to via the thread-shared memory information ID 501 (S2501).

In other words, first, the memory usage calculation part 324 calculates the set A {"#F1", "#F2"} of the frame-shared memory information IDs 401 that are directly or indirectly referred to from the referent-frame-shared memory information ID 305 or the referent-thread-shared memory information ID 306 of each frame-proprietary memory information S (see FIG. 24).

Then, the memory usage calculation part 324 calculates the set B {"#F2"} of the frame-shared memory information IDs 401 that are referred to via the thread-shared memory corresponding to the thread-shared memory information ID 501 in the set A. As a result, the set F {"#F1"}, which is the set A excluding the set B, is calculated.

In Step 2501, the set F, which is the set A excluding the set B, is calculated to prevent the memory usage of the frame-shared memory shared by a plurality of different threads from being added to the proprietary memory usage.

For example, the frame-shared memory corresponding to the frame-shared memory information with the frame-shared memory information ID 401 of "#F2" is referred to from the thread-shared memory corresponding to the thread-shared memory information with the thread-shared memory information ID 501 of "#T1". According to the embodiment of this invention, such a frame-shared memory that is referred to by the thread-shared memory is classified as "frame-shared memory", not "thread-shared memory". Accordingly, the processing of Step 2501 prevents the memory usage of the frame-shared memory that is referred to by the thread-shared memory in this way from being added to the proprietary memory usage.

The frame-shared memory that is referred to by a plurality of different threads in this way may be classified as a thread-shared memory. In this case, the set F that is calculated in Step 2501 is the set of the frame-shared memory information IDs 401 that are directly or indirectly referred to from the referent-frame-shared memory information ID 305 or the referent-thread-shared memory information ID 306 of the frame-proprietary memory information S.

In other words, in this Step 2501, the memory usage calculation part 324 determines an object which is used in an overlapping manner based on the reference relationship of individual objects that are referred to by the target thread.

In next Step 2502, the memory usage calculation part 324 calculates the total value F_SUM of the frame-shared memory usage 404 of the frame-shared memory information indicated by the set F (S2502). In the above-mentioned specific example, the set F is {"#F1"}. In Step 2502, therefore, the total value F_SUM is "60", which is the memory usage of the frame-shared memory with the frame-shared memory information ID 401 of "#F1".

In other words, in this Step 2502, the memory usage calculation part 324 calculates the size of a memory area storing an object shared (used in an overlapping manner) by different stack frames in the target thread among those objects that have been determined as being used in an overlapping manner in Step 2501.

In next Step 2503, the memory usage calculation part 324 calculates the sum of the total value S_SUM and the total value F_SUM (S2503). In the above-mentioned specific example, the total proprietary memory usage by the thread with the thread ID of "#1" becomes "180", which is the sum of "120" and "60".

Through the processes described above, the memory usage calculation part 324 can calculate the proprietary memory usage by a specific thread (thread with the thread ID 302 of "#1" in this example). It is to be noted that the proprietary memory usage by a thread is, in other words, the memory release always released when the thread is terminated.

[3. Calculation of Shared Memory Usage by Specific Thread]

Figure 26:
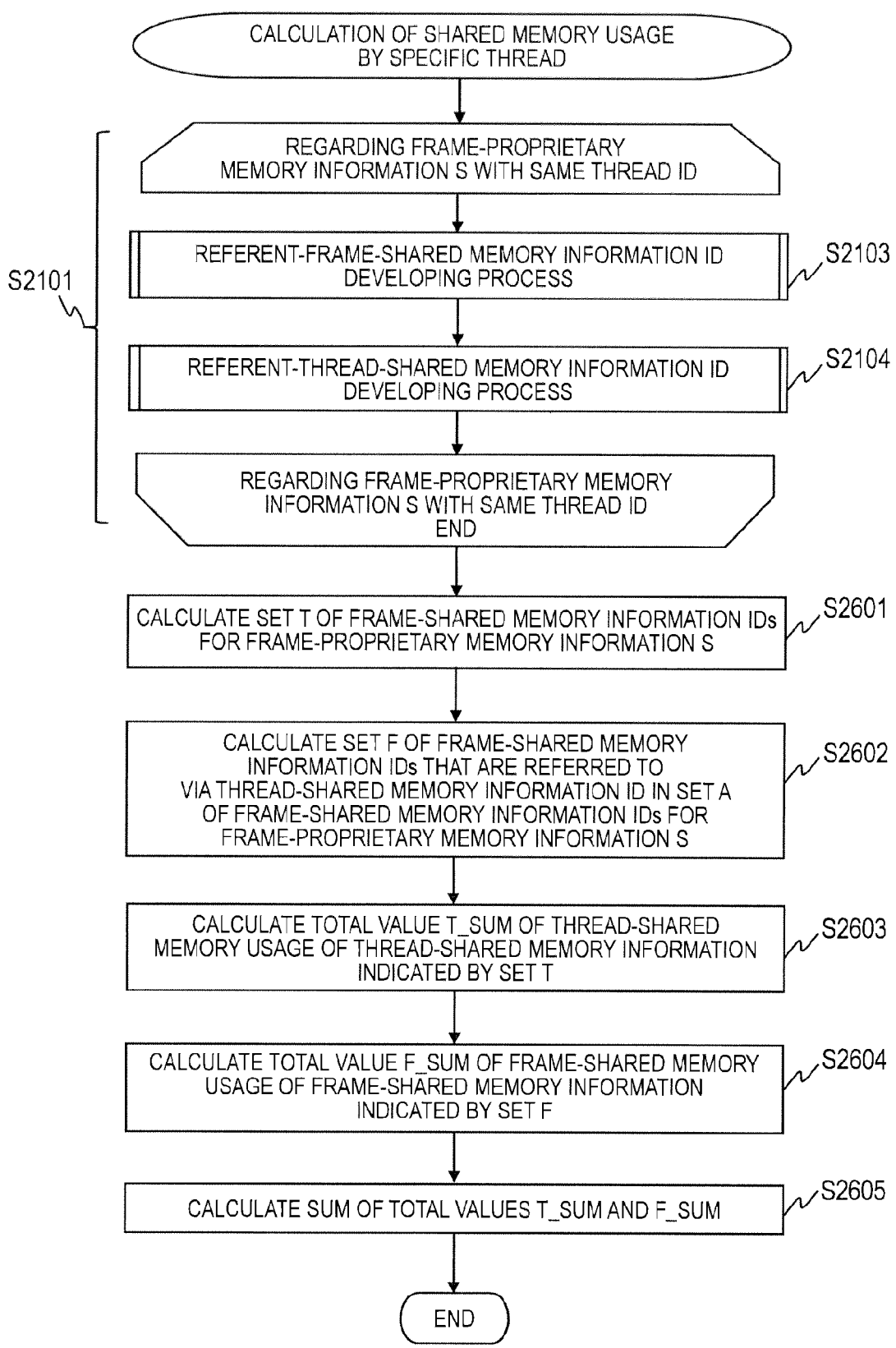
FIG. 26 is a flowchart illustrating the steps of a process of calculating a shared memory usage by a specific thread according to the embodiment of this invention.

FIG. 26 is a flowchart illustrating the steps of a process of calculating the shared memory usage by a specific thread according to the embodiment of this invention.

The memory usage calculation part 324 can calculate the shared memory usage by a specific thread by executing this process. When the total memory usage (see FIG. 21) and the proprietary memory usage (see FIG. 25) by a specific thread have already been calculated, the shared memory usage can be calculated as the difference between the total usage and the proprietary memory usage.

The shared memory usage by a specific thread may be calculated as the sum of the following total values T_SUM and F_SUM below.

T_SUM: Total value of the thread-shared memory usage 504 of thread-shared memory information indicated by the set T of thread-shared memory information IDs 501 that are directly or indirectly referred to from the referent-frame-shared memory information ID 305 or the referent-thread-shared memory information ID 306 of the frame-proprietary memory information S having the same thread ID 302 registered in the frame-proprietary memory information table 342a.

F_SUM: Total value of the frame-shared memory usage 404 of frame-shared memory information indicated by the set F of the frame-shared memory information IDs 401 that are referred to via the thread-shared memory information ID 501 in the set A of frame-shared memory information IDs 401 that are directly or indirectly referred to from the referent-frame-shared memory information ID 305 or the referent-thread-shared memory information ID 306 of the frame-proprietary memory information S.

The following describes the flowchart of FIG. 26. The following description is given of a case where the shared memory usage by the thread with the thread ID 302 (see FIG. 3) of "#1" is calculated, as a specific example. The same reference numerals are given to the same components as illustrated in FIG. 21 to avoid redundant description thereof.

In Step 2601, the memory usage calculation part 324 calculates the set T of the thread-shared memory information IDs 501 for each frame-proprietary memory information S having the same thread ID 302 (S2601).

In other words, the memory usage calculation part 324 calculates the set T {"#T1"} of the thread-shared memory information IDs 501 that are directly or indirectly referred to from the referent-thread-shared memory information ID 306 of each frame-proprietary memory information S with the same thread ID 302 of "#1" (see FIG. 24).

In other words, in this Step 2601, the memory usage calculation part 324 determines an object shared (used in an overlapping manner) by a plurality of different threads (including the target thread) based on the reference relationship of individual objects that are referred to by the target thread.

In next Step 2602, the memory usage calculation part 324 calculates the set F of the frame-shared memory information IDs 401 that are referred to via the thread-shared memory information ID 501 in the set A of the frame-shared memory information IDs 401 for each frame-proprietary memory information S having the same thread ID 302 (S2602).

In other words, first, the memory usage calculation part 324 calculates the set A {"#F1", "#F2"} of the frame-shared memory information IDs 401 that are directly or indirectly referred to from the referent-frame-shared memory information ID 305 or the referent-thread-shared memory information ID 306 of each frame-proprietary memory information S (see FIG. 24).

Then, the memory usage calculation part 324 calculates the set F {"#F2"} of the frame-shared memory information IDs 401 that are referred to via the thread-shared memory corresponding to the thread-shared memory information ID 501 in the set A.

In Step 2602, the set F in the set A is calculated to add the memory usage of the frame-shared memory shared by a plurality of different threads to the shared memory usage.

In other words, in this Step 2602, the memory usage calculation part 324 determines an object shared (used in an overlapping manner) by different stack frames in the target thread based on the reference relationship of individual objects that are referred to by the target thread.

In next Step 2603, the memory usage calculation part 324 calculates the total value T_SUM of the thread-shared memory usage 504 of the thread-shared memory information indicated by the set T (S2603). In the above-mentioned specific example, the set T is {"#T1"}. In Step 2603, therefore, the total value T_SUM is "72", which is the memory usage of the thread-shared memory with the thread-shared memory information ID 501 of "#T1".

In other words, in this Step 2603, the memory usage calculation part 324 calculates the size of a memory area storing an object that has been determined as being used in an overlapping manner in Step 2601.

In next Step 2604, the memory usage calculation part 324 calculates the total value F_SUM of the frame-shared memory usage 404 of the frame-shared memory information indicated by the set F (S2604). In the above-mentioned specific example, the set F is {"#F2"}. In Step 2604, therefore, the total value F_SUM becomes "12", which is the memory usage of the frame-shared memory with the frame-shared memory information ID 401 of "#F2".

In other words, in this Step 2604, the memory usage calculation part 324 calculates the size of a memory area storing an object that has been determined as being used in an overlapping manner in Step 2602.

In next Step 2605, the memory usage calculation part 324 calculates the sum of the total value T_SUM and the total value F_SUM (S2605). In the above-mentioned specific example, the shared memory usage by the thread with the thread ID of "#1" becomes "84", which is the sum of "72" and "12".

Through the processes described above, the memory usage calculation part 324 can calculate the shared memory usage by a specific thread (thread with the thread ID 302 of "#1" in this example). It is to be noted that the memory usage of the thread-shared memory is the memory release which is not necessarily be released when the thread is terminated.

FIG. 27 is a diagram illustrating an example of the purpose-based memory usage of each thread according to the embodiment of this invention.

The example illustrated in FIG. 27 illustrates the proprietary memory usage, the shared memory usage, and the total memory usage by each of threads 1 to n illustrated in FIG. 15. In other words, FIG. 27 illustrates a thread ID 2701, a proprietary memory usage 2702, a shared memory usage 2703, and a total memory usage 2704 in association with one another information.

The proprietary memory usage 2702 is calculated through the processing illustrated in FIG. 25. The shared memory usage 2703 is calculated through the processing illustrated in FIG. 26. The total memory usage 2704 is calculated through the processing illustrated in FIG. 21.

[4. Calculation of Memory Usage and Memory Release by a Plurality of Threads]

The following describes the process for the memory usage calculation part 324 to calculate the memory usage and memory release by a plurality of threads.

First, the memory usage by a plurality of threads is described.

To calculate the memory usage by a plurality of threads, the memory usage calculation part 324 considers the reference relationship between the frame-shared memory and the thread-shared memory shared by the plurality of threads. The reference relationship is acquired through the above-mentioned referent-frame-shared memory information ID developing process (see FIG. 22) and referent-thread-shared memory information ID developing process (see FIG. 23).

For example, the thread with the thread ID 302 of "#1" in the frame-proprietary memory information table 342d after development illustrated in FIG. 24 is referring to the thread-shared memory that corresponds to the thread-shared memory information having the thread-shared memory information ID 501 of "#T1".

Likewise, the thread with the thread ID 302 of "#2" is referring to the thread-shared memory that corresponds to the thread-shared memory information having the thread-shared memory information ID 501 of "#T1".

Further, the thread with the thread ID 302 of "#3" is referring to the thread-shared memory that corresponds to the thread-shared memory information having the thread-shared memory information IDs 501 of "#T1" and "#T2".

Further, the thread with the thread ID 302 of "#n" is referring to the thread-shared memory that corresponds to the thread-shared memory information having the thread-shared memory information ID 501 of "#T2".

In other words, the threads having the thread IDs 302 of "#1", "#2" and "#3" share the thread-shared memory corresponding to the thread-shared memory information with the thread-shared memory information ID 501 of "#T1". Likewise, the threads having the thread IDs 302 of "#3" and "#n" share the thread-shared memory corresponding to the thread-shared memory information with the thread-shared memory information ID 501 of "#T2".

Therefore, the memory usage calculation part 324 calculates the memory usage of a plurality of threads based on the reference relation in such a way that the frame-shared memory information shared by the plurality of threads and the memory usage of the thread-shared memory shared by the plurality of threads are not added in duplication.

In newly executing a thread X that shares a thread-shared memory T with another thread, the memory usage calculation part 324 can calculate an increase in the memory usage by the thread X.

For example, when there is not any other thread referring to the thread-shared memory T at the time the thread X is newly executed, an increase in the memory usage by the thread X is the sum of the proprietary memory usage by the thread X and the memory usage of the thread-shared memory T. When there is another thread referring to the thread-shared memory T, on the other hand, an increase in the memory usage by the thread X is the proprietary memory usage by the thread X.

The memory usage calculation part 324 can calculate the memory release released when execution of the plurality of threads is terminated.

FIG. 28 is a diagram illustrating an example of the memory release released when execution of the plurality of threads is terminated according to the embodiment of this invention.

FIG. 28 illustrates the release of the thread-proprietary memory, the release of the thread-shared memory, and the total release of memory when arbitrary two threads in the threads 1 to n illustrated in FIG. 15 are terminated. In other words, FIG. 28 illustrates a thread ID 2801, a thread-proprietary memory release 2802, a thread-shared memory release 2803, and a total memory release 2804 in association with one another.

The thread-proprietary memory release 2802 is the release of the thread-proprietary memory released when a plurality of threads indicated by the thread ID 2801 are terminated. The thread-proprietary memory release 2802 is calculated as the total value of the thread-proprietary memory usage of the individual threads indicated by the thread ID 2801.

When the thread ID 2801 is {"#1", "#2"}, for example, the thread-proprietary memory release 2802 becomes "300", which is the sum of the memory usage of the frame-proprietary memory of "180" with the thread ID 2701 (see FIG. 27) of "#1", and the memory usage of the frame-proprietary memory of "120" with the thread ID 2701 of "#2".

The thread-shared memory release 2803 is the release of the thread-shared memory released when a plurality of threads indicated by the thread ID 2801 are terminated. The thread-shared memory release 2803 is calculated as the memory usage of the thread-shared memory that is shared only by a plurality of threads indicated by the thread ID 2801.

When the thread ID 2801 is {"#1", "#2"}, for example, there is not a thread-shared memory that is shared only by the two threads. Therefore, the thread-shared memory release 2803 becomes "0". When the thread ID 2801 is {"#3", "#n"}, on the other hand, the thread-shared memory release 2803 becomes "120", which is the thread-shared memory usage 504 of the thread-shared memory that is shared only by those two threads and has the thread-shared memory information ID 501 (see FIG. 5) of "#T2".

The total memory release 2804 is the total release of memory released when a plurality of threads indicated by the thread ID 2801 are terminated. The total memory release 2804 is calculated as the sum of the thread-proprietary memory release 2802 and the thread-shared memory release 2803.

As described above, the memory usage calculation part 324 according to the embodiment of this invention can efficiently and accurately calculate the amount of memory that is actually used at an arbitrary point of time by the process that is executed by a thread.

[Control of Process Executed by Thread]

Figure 29:
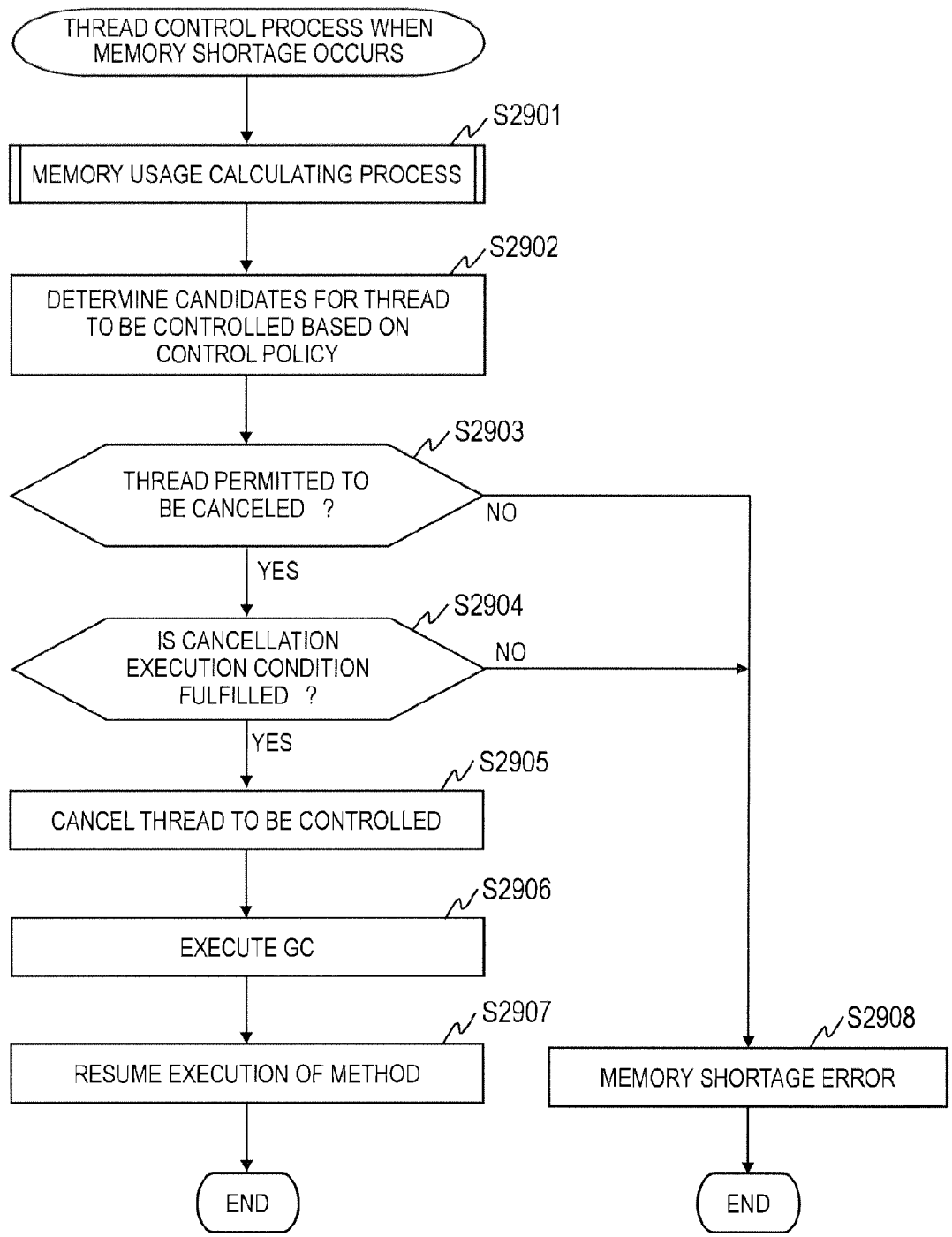
FIG. 29 is a flowchart illustrating the steps of a thread control process when memory shortage occurs according to the embodiment of this invention.

FIG. 29 is a flowchart illustrating the steps of a thread control process when memory shortage occurs according to the embodiment of this invention. The Java VM 32 executes this process when the memory is short.

First, in Step 2901, the Java VM 32 executes the memory usage calculating process (S2901). As a result, the Java VM 32 acquires the status of the memory usage by each thread. The details of the memory usage calculating process are the same as described above with reference to FIG. 8.

Next, in Step 2902, the Java VM 32 determines candidates for a thread to be controlled based on a control policy of the computer system 1 (S2902). The candidates for the thread to be controlled may be one in number or plural in number in accordance with the control policy. In addition, the control policy may be specified by the configuration file 42, or may be specified by another method.

In next Step 2903, the Java VM 32 determines whether the candidate for the thread to be controlled determined in Step 2902 has been permitted to be canceled (terminated or canceled) based on information set in the configuration file 42 (S2903). A thread which is permitted to be canceled may be directly set like "thread X" or may be indirectly set like "thread executing the method X" in the configuration file 42.

Then, in Step 2904, the Java VM 32 determines whether an execution condition for canceling the thread is fulfilled based on information set in the configuration file 42 (S2904). The execution conditions for canceling the thread are, for example, such a condition that the amount of the memory to be released by cancellation of the candidate for the thread to be controlled is equal to or greater than a predetermined threshold.

When the result of the determination in Step 2903 is YES and the result of the determination in Step 2904 is YES, the Java VM 32 (memory usage calculation part 324) requests the thread control part 322 to cancel the thread to be controlled, and the thread control part 322 cancels the thread to be controlled (S2905).

Then, in Step 2906, the Java VM 32 requests the GC execution part 323 to execute the GC, and the GC execution part 323 executes the GC (S2906). This releases an unnecessary memory area.

In next Step 2907, the Java VM 32 resumes execution of the method (S2907). When the result of the determination in Step 2903 is NO or the result of the determination in Step 2904 is NO, the Java VM 32 notifies of a memory shortage error (S2908).

Through the processes described above, when the memory shortage occurs the Java VM 32 specifies a thread that causes the memory shortage, and cancels the thread so that the GC permits an unnecessary memory to be used again. This makes it possible to efficiently avoid interruption of the Java VM 32 originating from the memory shortage, and keep execution of the method.

Although the description referring to FIG. 29 has been given of the case where the control target is a thread, the case is not restrictive. For example, the control target may be a process that is executed by a thread.

Figure 30:
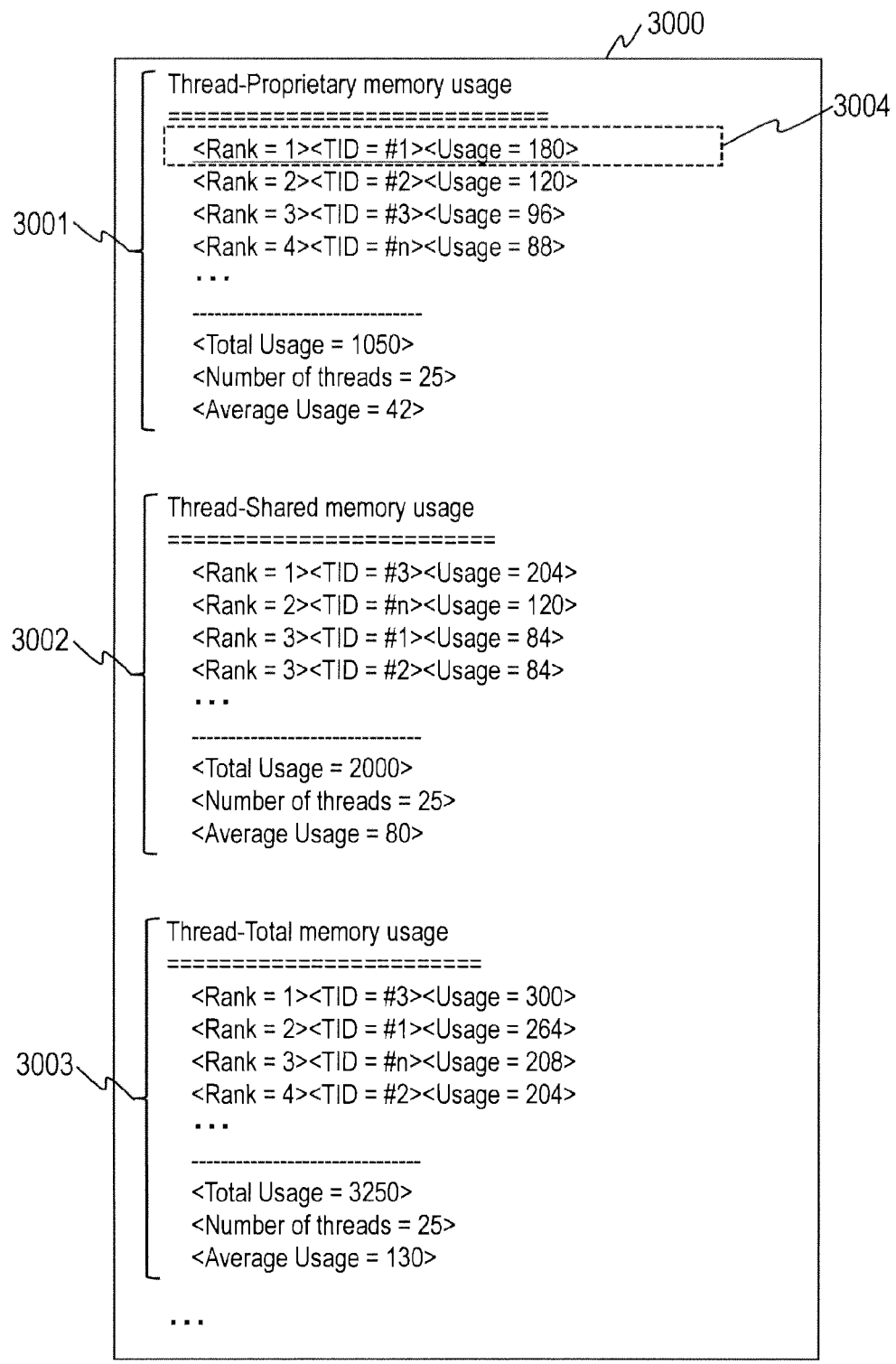
FIG. 30 is a diagram illustrating an output example of the result of calculating the memory usage according to the embodiment of this invention.

FIG. 30 is a diagram illustrating an output example of the result of calculating the memory usage according to the embodiment of this invention. The memory information output part 325 (see FIG. 1) generates, for example, an output screen 3000 based on the result of the calculation executed by the memory usage calculation part 324, and outputs the output screen 3000 onto the display (output device 6). The output screen 3000 may be output as a log data.

The output screen 3000 illustrated in FIG. 30 corresponds to the result of calculating the memory usage by each thread illustrated in FIG. 27. In other words, output contents 3001, 3002 and 3003 respectively represent pieces of information acquired by ranking the proprietary memory usage 2702, the shared memory usage 2703, and the total memory usage 2704 of each thread, and sorting the usage by ranking based on the memory usage.

FIG. 30 illustrates a variable "Rank" representing a ranking. A variable "TID" represents the thread ID. A variable "Usage" represents the memory usage. A variable "Total Usage" represents the total usage of the memory. A variable "Number of Threads" represents the number of threads. A variable "Average Usage" represents the average value of the memory usage, in other words, the memory usage per thread.

Further, information representing the memory usage by each thread (for example, output information 3004) may be selected on the output screen 3000. A user selects the output information 3004 by using the input device 5 (for example, clicking of a mouse). Then, the memory information output part 325 generates a detailed output screen 3100 (see FIG. 31) relating to the selected output information 3004, and outputs the output screen 3100 onto the display. As a result, the output screen is changed. The output screen 3100 is described later with reference to FIG. 31.

Figure 31:
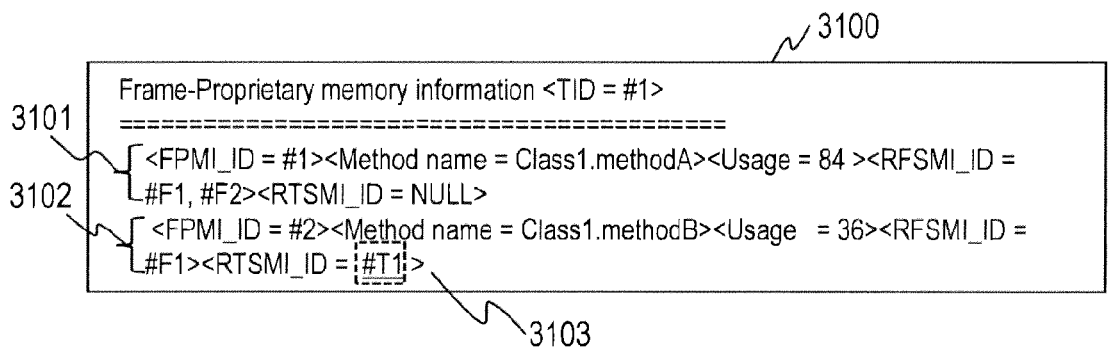
FIG. 31 is a diagram illustrating a first detailed output example of the result of calculating the memory usage according to the embodiment of this invention.

FIG. 31 is a diagram illustrating a first detailed output example of the result of calculating the memory usage according to the embodiment of this invention.

The output screen 3100 illustrated in FIG. 31 is associated with detailed information of the output information 3004 selected in FIG. 30. The "detail information" in this case is frame-proprietary memory information about a thread relating to the output information 3004 (thread with the thread ID of "#1"). In other words, output contents 3101 and 3102 respectively represent pieces of the frame-proprietary memory information with the frame-proprietary memory information IDs 301 of "#1" and "#2".

FIG. 31 illustrates a variable "FPMI ID" representing the frame-proprietary memory information ID 301. A variable "Method name" represents the method name 303. A variable "Usage" represents the frame-proprietary memory usage 304. A variable "RFSMI ID" represents the referent-frame-shared memory information ID 305. A variable "RTSMI ID" represents the referent-thread-shared memory information ID 306.

Further, information representing the referent-thread-shared memory information ID 306 (for example, output information 3103) may be selected on the output screen 3100. The user selects the output information 3103 by using the input device 5. Then, the memory information output part 325 generates a detailed output screen 3200 (see FIG. 32) relating to the selected output information 3103, and outputs the output screen 3200 onto the display. The output screen 3200 is described later with reference to FIG. 32.

Figure 32:
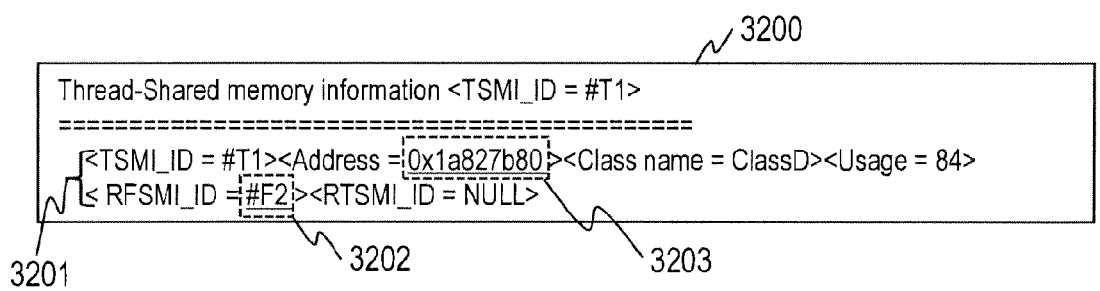
FIG. 32 is a diagram illustrating a second detailed output example of the result of calculating the memory usage according to the embodiment of this invention.

FIG. 32 is a diagram illustrating a second detailed output example of the result of calculating the memory usage according to the embodiment of this invention.

The output screen 3200 illustrated in FIG. 32 is associated with detailed information of the output information 3103 selected in FIG. 31. The "detail information" in this case is thread-shared memory information about the referent-thread-shared memory information ID relating to the output information 3103 ("#T1"). In other words, output content 3201 represents the thread-shared memory information with the thread-shared memory information ID 501 of "#T1".

FIG. 32 illustrates a variable "TSMI_ID" representing the thread-shared memory information ID 501. A variable "Address" represents the address 502. A variable "Class name" represents the class name 503. A variable "Usage" represents the thread-shared memory usage 504. A variable "RTSMI_ID" represents the referent-frame-shared memory information ID 505. A variable "RTSMI_ID" represents the referent-thread-shared memory information ID 506.

Further, information representing the referent-frame-shared memory information ID 505 (for example, output information 3202) and information representing the address 502 (for example, output information 3203) may be selected on the output screen 3200. The user selects the pieces of output information 3202 and 3203 by using the input device 5. Then, the memory information output part 325 generates detailed output screens 3300 and 3400 relating to the selected pieces of output information 3202 and 3203, and outputs the output screens 3300 and 3400 onto the display. The output screens 3300 and 3400 are described later with reference to FIGS. 33 and 34, respectively.

Figure 33:
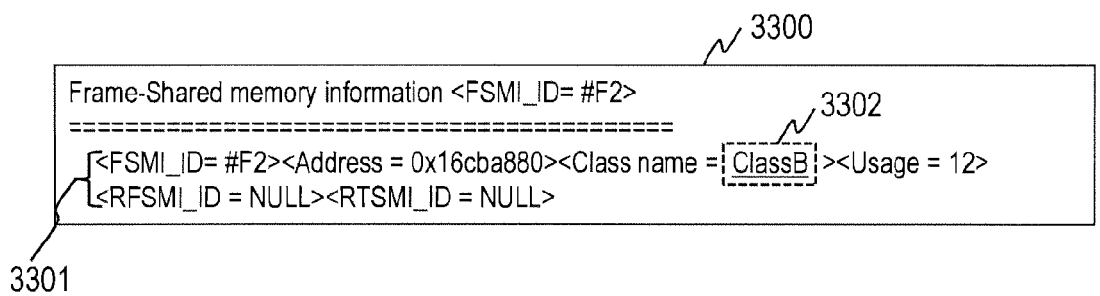
FIG. 33 is a diagram illustrating a third detailed output example of the result of calculating the memory usage according to the embodiment of this invention.

FIG. 33 is a diagram illustrating a third detailed output example of the result of calculating the memory usage according to the embodiment of this invention.

The output screen 3300 illustrated in FIG. 33 is associated with detailed information of the output information 3202 selected in FIG. 32. The "detail information" in this case is frame-shared memory information about the referent-frame-shared memory information ID relating to the output information 3202 ("#F2"). In other words, output content 3301 represents the frame-shared memory information with the frame-shared memory information ID 401 of "#F2".

FIG. 33 illustrates a variable "FSMI_ID" representing the frame-shared memory information ID 401. A variable "Address" represents the address 402. A variable "Class name" represents the class name 403. A variable "Usage" represents the frame-shared memory usage 404. A variable "RFSMI_ID" represents the referent-frame-shared memory information ID 405. A variable "RTSMI_ID" represents the referent-thread-shared memory information ID 406.

Further, information representing the class name (for example, output information 3302) may be selected on the output screen 3300. The user selects the output information 3302 by using the input device 5. Then, the memory information output part 325 generates a detailed output screen 3500 (see FIG. 35) relating to the selected output information 3302, and outputs the output screen 3500 onto the display. The output screen 3500 is described later with reference to FIG. 35.

FIG. 34 is a diagram illustrating a fourth detailed output example of the result of calculating the memory usage according to the embodiment of this invention.

The output screen 3400 illustrated in FIG. 34 is associated with detailed information of the output information 3203 selected in FIG. 32. The "detail information" in this case is object reference about the address relating to the output information 3203.

FIG. 35 is a diagram illustrating a fifth detailed output example of the result of calculating the memory usage according to the embodiment of this invention.

The output screen 3500 illustrated in FIG. 35 is associated with detailed information of the output information 3302 selected in FIG. 33. The "detail information" in this case is object reference about the class name relating to the output information 3302.

Figure 36:
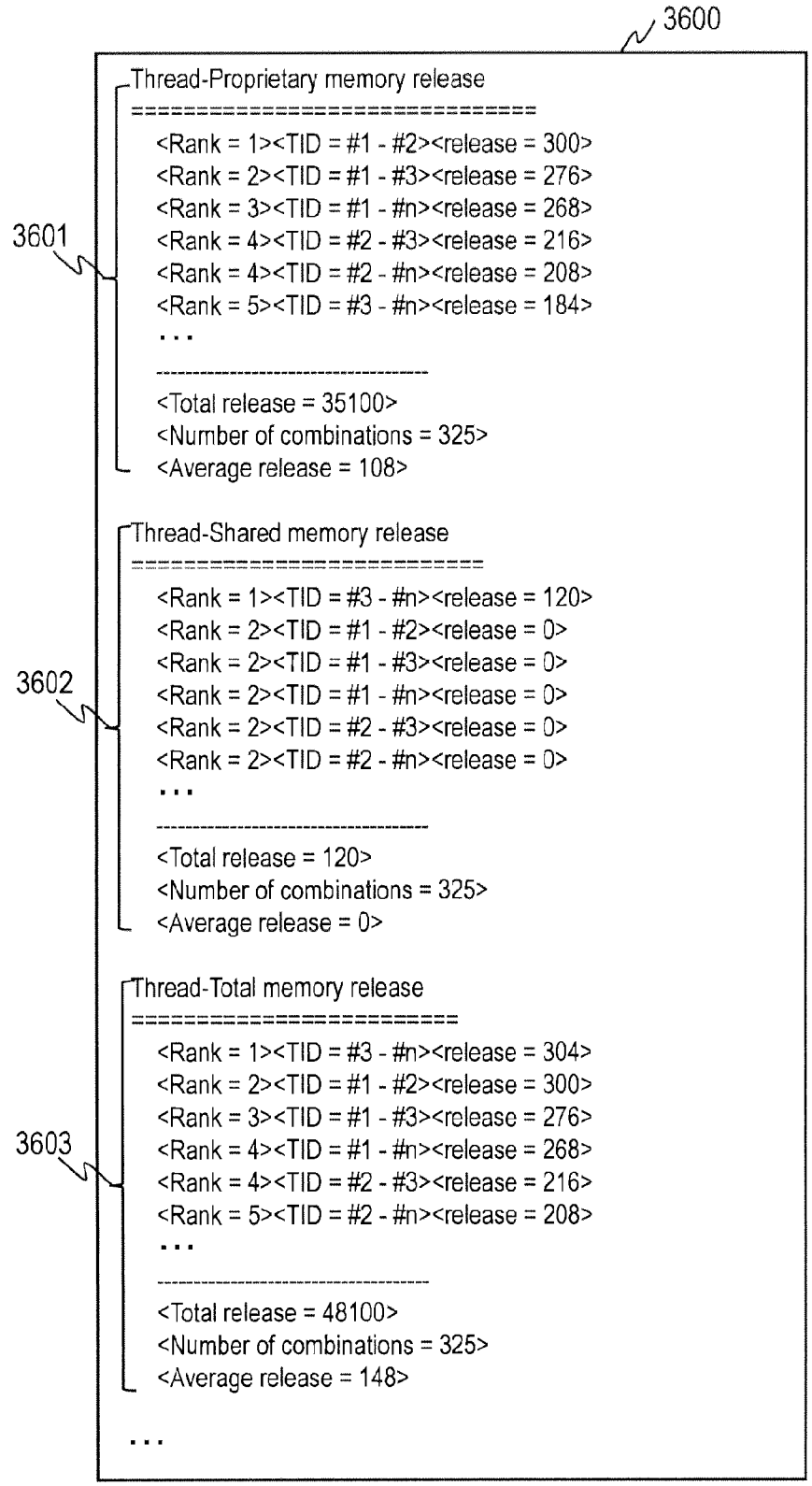
FIG. 36 is a diagram illustrating an output example of the result of calculating the memory release according to the embodiment of this invention.

FIG. 36 is a diagram illustrating an output example of the result of calculating the memory release according to the embodiment of this invention. The memory information output part 325 (see FIG. 1) generates, for example, an output screen 3600 based on the result of the calculation executed by the memory usage calculation part 324, and outputs the output screen 3600 onto the display (output device 6). The output screen 3600 may be output as a log data.

The output screen 3600 illustrated in FIG. 36 corresponds to the result of calculating the memory release when each thread illustrated in FIG. 28 is terminated. In other words, output contents 3601, 3602, and 3603 respectively represent pieces of information acquired by ranking the thread-proprietary memory release 2802, the thread-shared memory release 2803, and the total memory release 2804 when a plurality of threads indicated by the respective thread IDs 2801 are terminated, and sorting the amounts by ranking based on the memory release.

FIG. 30 illustrates a variable "Rank" representing a ranking. A variable "TID" represents the thread ID. A variable "Release" represents the memory release. A variable "Total Release" represents the total memory release. A variable "Number of combinations" represents the number of combinations of a plurality of threads. A variable "Average release" represents the average value of the memory release, in other words, the memory release per a single combination of a plurality of threads.

As described above, the memory information output part 325 according to the embodiment of this invention can output the result of the calculation executed by the memory usage calculation part 324. This makes it possible to monitor threads using the calculation result. For example, the flow rate can be controlled depending on the memory usage by threads. In addition, threads can be controlled by using the calculation result. For example, it is possible to identify a thread that has a large memory usage, and cancel the execution of the identified thread, thereby releasing the memory. This makes it possible to efficiently suppress the entire system down due to an insufficient memory.

Although the description of the embodiment of this invention has been given of the case where this invention is adapted to the calculation of the memory usage (memory release) in a process which is executed by a thread, this invention is not limited to the case, and may be adapted to other types of processing. For example, this invention may be adapted to all kinds of processing using what constructs a reference relationship, such as resources. Such processes include a program in a broad sense, and include processing which is executed by a thread, processing which is executed in a process, processing which is executed by a CPU, and so forth in a narrow sense. Likewise, this invention may be adapted to all kinds of processing which construct a reference relationship as resources of calculating the memory usage (memory release). The processes include a data structure, a module, and a library in a broad sense, and include an object, a memory, a file (descriptor), and so forth in a narrow sense.

Though the detailed description has been given of this invention referring to the attached drawings, this invention is not limited to this specific configuration, and includes various variations and equivalent configurations within the scope of the accompanying claims.

What is claimed is:

1. A computer for calculating usage of a memory used by a process that is executed in a predetermined processing unit, the computer comprising:
   the memory for storing a program; and
   a processor for executing the program stored in the memory in each predetermined processing unit,
   wherein the processor is configured to execute, on a virtual machine, the program stored in the memory on a thread-by-thread basis,
   wherein the memory comprises a memory area for storing overlapping objects that are used in an overlapping manner when the program is executed, and a memory area for storing non-overlapping objects that are not used in an overlapping manner when the program is executed, and stores a reference relationship information which indicates a reference relationship of individual objects that are referred to by each thread, and
   wherein the processor is configured to:
   analyze, when calculating the usage of the memory used by the process that is executed on the thread-by-thread basis, the reference relationship information to determine which object in the overlapping objects is used by the process and which object in the non-overlapping objects is used by the process;
   calculate the usage of the memory used by the process based on a result of the determination by executing the following process steps:
      (1) calculating a total stack frame-proprietary memory usage value of a particular thread based on non-overlapping objects referred to by the particular thread;
      (2) calculating a total stack frame-shared memory usage value of the particular thread based on overlapping objects that are shared by different stack frames and referred to by the particular thread;
      (3) calculating a total thread-shared memory usage value of the particular thread based on overlapping objects that are shared by different threads and referred to by the particular thread;
      and
      (4) calculating a sum of the calculated total stack frame-proprietary memory usage value, total stack frame-shared memory usage value, and total thread-shared memory usage value; and
   control, when a memory shortage occurs, the virtual machine to identify, based on the calculated memory usage, a thread that causes the memory shortage, and to cancel the identified thread so that a garbage collector of the virtual machine reuses a memory used by the canceled thread.

2. The computer according to claim 1, wherein the overlapping objects comprise an object that is used by a plurality of different stack frames in the same thread, and an object that is used by a plurality of different threads.

3. The computer according to claim 1, wherein the processor is further configured to:
   calculate usage of the memory used by a process that is executed by each thread;
   determine whether or not a process that is executed by a predetermined thread is cancelled based on the calculated usage of the memory used by the process that is executed by the each thread; and cancel the process that is executed by the predetermined thread when it is determined that the process is cancelled.

4. The computer according to claim 1, wherein, based on the result of the determination, the processor calculates release of the memory released when the process is terminated.

5. The computer according to claim 1, wherein the processor is further configured to:
   calculate the usage of the memory used by the process that is executed by each thread; and
   generate data for outputting the calculated usage of the memory used by the process that is executed by the each thread.

6. A resource usage calculation method for calculating usage of a memory used by a process that is executed in a predetermined processing unit in a computer, the computer comprising the memory for storing a program and a processor for executing the program stored in the memory in each predetermined processing unit wherein the processor is configured to execute, on a virtual machine, the program stored in the memory on a thread-by-thread basis,
   the memory comprising a memory area for storing overlapping objects that are used in an overlapping manner when the program is executed, and a memory area for storing non-overlapping objects that are not used in an overlapping manner when the program is executed, and storing a reference relationship information which indicates a reference relationship of individual objects that are referred to by each thread,
   the resource usage calculation method comprising the steps of:
   analyzing, by the processor, when calculating the usage of the memory used by the process that is executed on the thread-by-thread basis, the reference relationship information to determine which object in the overlapping objects is used by the process and which object in the non-overlapping objects is used by the process; and
   calculating, by the processor, the usage of the memory used by the process based on a result of the determination by executing the following steps:
      (1) calculating a total stack frame-proprietary memory usage value of a particular thread based on non-overlapping objects referred to by the particular thread;
      (2) calculating a total stack frame-shared memory usage value of the particular thread based on overlapping objects that are shared by different stack frames and referred to by the particular thread;
      (3) calculating a total thread-shared memory usage value of the particular thread based on overlapping objects that are shared by different threads and referred to by the particular thread; and
      (4) calculating a sum of the calculated total stack frame-proprietary memory usage value, total stack frame-shared memory usage value, and total thread-shared memory usage value; and
   when a memory shortage occurs, controlling, by the processor, the virtual machine to identify, based on the calculated memory usage, a thread that causes the memory shortage, and to cancel the identified thread so that a garbage collector of the virtual machine reuses a memory used by the canceled thread.

7. The resource usage calculation method according to claim 6, further comprising the steps of:
   calculating, by the processor, usage of the memory used by a process that is executed by each thread;
   determining, by the processor, whether or not a process that is executed by a predetermined thread is cancelable based on the calculated usage of the memory used by the process that is executed by the each thread; and
   canceling, by the processor, the process that is executed by the predetermined thread when it is determined that the process is cancelable.

8. The resource usage calculation method according to claim 6, further comprising a step of calculating, by the processor, based on the result of the determination, release of the memory released when the process is terminated.

9. The resource usage calculation method according to claim 6, further comprising the steps of:
   calculating, by the processor, the usage of the memory used by the process that is executed by each thread; and
   generating, by the processor, data for outputting the calculated usage of the memory used by the process that is executed by the each thread.

10. A non-transitory computer-readable medium storing a resource usage calculation program for calculating usage of a memory used by a process that is executed in a predetermined processing unit, to be executed in a computer, the computer comprising the memory for storing a program and a processor for executing the program stored in the memory in each predetermined processing unit wherein the processor is configured to execute, on a virtual machine, the program stored in the memory on a thread-by-thread basis,
   the memory comprising a memory area for storing overlapping objects that are used in an overlapping manner when the program is executed, and a memory area for storing non-overlapping objects that are not used in an overlapping manner when the program is executed, and storing a reference relationship information which indicates a reference relationship of individual objects that are referred to by each thread,
   the resource usage calculation program controlling the processor to execute the steps of:
   analyzing, when calculating the usage of the memory used by the process that is executed on the thread-by-thread basis, the reference relationship information to determine which object in the overlapping objects is used by the process and which object in the non-overlapping objects is used by the process; and
   calculating the usage of the memory used by the process based on a result of the determination by executing the following steps:
      (1) calculating a total stack frame-proprietary memory usage value of a particular thread based on non-overlapping objects referred to by the particular thread;
      (2) calculating a total stack frame-shared memory usage value of the particular thread based on overlapping objects that are shared by different stack frames and referred to by the particular thread;
      (3) calculating a total thread-shared memory usage value of the particular thread based on overlapping objects that are shared by different threads and referred to by the particular thread; and
      (4) calculating a sum of the calculated total stack frame-proprietary memory usage value, total stack frame-shared memory usage value, and total thread-shared memory usage value; and
   controlling, when a memory shortage occurs, the virtual machine to identify, based on the calculated memory usage, a thread that causes the memory shortage, and to cancel the identified thread so that a garbage collector of the virtual machine reuses a memory used by the canceled thread.

11. The non-transitory computer-readable medium according to claim 10, the resource usage calculation program further controlling the processor to execute the steps of:
   calculating usage of the memory used by a process that is executed by each thread;
   determining whether or not a process that is executed by a predetermined thread is cancelable based on the calculated usage of the memory used by the process that is executed by the each thread; and
   canceling the process that is executed by the predetermined thread when it is determined that the process is cancelable.

12. The non-transitory computer-readable medium according to claim 10, the resource usage calculation program further controlling the processor to execute a step of calculating, based on the result of the determination, release of the memory released when the process is terminated.

13. The non-transitory computer-readable medium according to claim 10, the resource usage calculation program further controlling the processor to execute the steps of:
   calculating the usage of the memory used by the process that is executed by each thread; and
   generating data for outputting the calculated usage of the memory used by the process that is executed by the each thread.

* * * * *